United States Patent
Udd

(10) Patent No.: US 9,453,771 B2
(45) Date of Patent: Sep. 27, 2016

(54) FIBER-GRATING SENSORS HAVING LONGITUDINAL-STRAIN-INDUCING JACKETS AND SENSOR SYSTEMS AND STRUCTURES INCLUDING SUCH SENSORS

(71) Applicant: Wicor Holding AG, Rapperswil (CH)

(72) Inventor: Eric Udd, Fairview, OR (US)

(73) Assignee: Wicor Holding AG, Rapperswil (CH)

( * ) Notice: Subject to any disclaimer, the term of this patent is extended or adjusted under 35 U.S.C. 154(b) by 0 days.

(21) Appl. No.: 14/262,137

(22) Filed: Apr. 25, 2014

(65) Prior Publication Data

US 2014/0321799 A1    Oct. 30, 2014

Related U.S. Application Data

(60) Provisional application No. 61/816,466, filed on Apr. 26, 2013.

(51) Int. Cl.
*G02B 6/00* (2006.01)
*G01L 1/24* (2006.01)
(Continued)

(52) U.S. Cl.
CPC ............. *G01L 1/246* (2013.01); *G01L 1/243* (2013.01); *G02B 6/022* (2013.01); *G01D 5/35316* (2013.01); *G02B 2006/12135* (2013.01)

(58) Field of Classification Search
CPC ........ G01L 1/246; G01L 1/243; G02B 6/022
USPC ................. 385/12, 13; 250/227.14, 227.18
See application file for complete search history.

(56) References Cited

U.S. PATENT DOCUMENTS 1,961,761 A    6/1934   Hendricks, Jr.
3,929,010 A    12/1975  Tjernstrom
(Continued)

FOREIGN PATENT DOCUMENTS

CA    2576978    3/2006
CA    2541028    9/2006
(Continued)

OTHER PUBLICATIONS

International Search Report and Written Opinion dated Aug. 11, 2014, in corresponding International Application No. PCT/US2014/035485 filed Apr. 25, 2014.
(Continued)

*Primary Examiner* — Robert Tavlykaev
(74) *Attorney, Agent, or Firm* — Downs Rachlin Martin PLLC

(57) ABSTRACT

A sensor comprising an optical fiber that includes a Bragg grating and a longitudinal-strain-inducing (LSI) jacket for inducing longitudinal strain into the optical fiber as a function of a transverse load, i.e., pressure or force. As the LSI jacket induces strain into the optical fiber, the fiber grating deforms, thereby changing the character of light reflected from the grating. The changes in character of the reflected light can be measured using suitable optical instrumentation. Additional physical characteristics that can be measured/sensed using an LSI-jacket-based sensor include moisture content/presence, chemical content/presence, and temperature. A transverse-load-sensing sensor can include transverse-load-applying structures that compress the LSI jacket under transverse load, causing the jacket to controllably elongate and thereby induce longitudinal strain into the optical fiber. Chemical and moisture LSI jackets can comprise materials that swell in the presence of the chemical or moisture.

28 Claims, 15 Drawing Sheets

(51) Int. Cl.
*G02B 6/02* (2006.01)
*G02B 6/12* (2006.01)
*G01D 5/353* (2006.01)

(56) References Cited

U.S. PATENT DOCUMENTS

| | | | |
|---|---|---|---|
| 4,009,461 | A | 2/1977 | Usry |
| 5,591,965 | A | 1/1997 | Udd |
| 5,841,131 | A * | 11/1998 | Schroeder et al. ...... 250/227.17 |
| 6,218,661 | B1 * | 4/2001 | Schroeder et al. ...... 250/227.14 |
| 6,384,404 | B1 * | 5/2002 | Berg ........................ 250/227.16 |
| 6,580,855 | B1 | 6/2003 | Vohra et al. |
| 6,718,268 | B2 | 4/2004 | Fantana et al. |
| 6,874,224 | B2 | 4/2005 | Ahuja et al. |
| 7,119,646 | B2 | 10/2006 | Golner et al. |
| 7,187,453 | B2 | 3/2007 | Belleville |
| 7,259,862 | B2 | 8/2007 | Duplain |
| 7,265,847 | B2 | 9/2007 | Duplain et al. |
| 7,516,651 | B2 | 4/2009 | Aubin et al. |
| 7,689,071 | B2 | 3/2010 | Belleville et al. |
| 7,697,797 | B2 | 4/2010 | Chin et al. |
| 7,759,633 | B2 | 7/2010 | Duplain et al. |
| 8,522,626 | B2 | 9/2013 | Woodcock |
| 8,763,476 | B2 | 7/2014 | Woodcock |
| 2001/0030281 | A1 * | 10/2001 | Schulz et al. ............ 250/227.21 |
| 2007/0116402 | A1 * | 5/2007 | Slade et al. ..................... 385/12 |
| 2008/0197977 | A1 | 8/2008 | Wada et al. |
| 2010/0329602 | A1 | 12/2010 | Shah et al. |
| 2011/0226070 | A1 * | 9/2011 | Berendes ............. G01L 5/0085 73/862.55 |
| 2012/0247229 | A1 | 10/2012 | Woodcock |

FOREIGN PATENT DOCUMENTS

| | | |
|---|---|---|
| DE | 3536900 | 4/1987 |
| DE | 102007013466 | 10/2008 |
| EP | 2120317 | 11/2009 |
| WO | 2006066393 | 6/2006 |
| WO | 2007037756 | 4/2007 |
| WO | 2009138370 | 11/2009 |

OTHER PUBLICATIONS

W. Kunzler, S. Calvert and M. Laylor, "Implementing Fiber Optic Sensors to Monitor Humidity and Moisture", Proceedings of SPIE, vol. 5384, p. 54, 2004.

T. Yamate, R. Schroeder, R. T. Rogerio and E. Udd, "Separation Method of Dual Peaks Produced by Birefringence Using Polarization Control", Proceedings of OFS-16, Nara, Japan, p. 64, 2003.

W. Kunzler, S. G. Calvert, and M. Laylor, "Measuring Humidity and Moisture with Fiber Optic Sensors", Proceedings of SPIE, vol. 5278, p. 86, 2003.

T. Yamate, R. T. Ramos, R. J. Schroeder, R. Madhaven and E. Udd, "Transversely Loaded Bragg Grating Pressure Transducer with Mechanically Enhancing the Sensitivity", Proceedings of OFS-15, Portland, Oregon, IEEE, p. 535, 2002.

S. Kreger, S. Calvert and E. Udd, "High Pressure Sensing Using Fiber Bragg Gratings Written into Birefringent Side Hole Fiber", Proceedings of OFS-15, Portland, Oregon, IEEE, p. 355, 2002.

M. Laylor, S. Calvert, T. Taylor, W. Schulz, R. Lumsden and E. Udd, "Fiber Optic Grating Moisture and Humidity Sensors", Proceedings of SPIE, vol. 4694, p. 210, 2002.

T. Yamate, R.T. Ramos, R.J. Schroeder, E. Udd, "Thermally Insensitive Pressure Measurements up to 300 degree C using Fiber Bragg Gratings Written onto Side Hole Single Mode Fiber", SPIE Proceedings, vol. 4185, p. 628, 2000.

E. Udd, W.L. Schulz, J.M. Seim, A. Trego, E. Haugse, P.E. Johnson, "Use of Transversely Loaded Fiber Grating Strain Sensors for Aerospace Applications", SPIE Proceedings, vol. 3994, p. 96, 2000.

"The Effects on Winding Clamping Pressure Due to Changes in Moisture, Temperature and Insulation Age," by Tom Prevost, David J. Woodcock, Christoph Krause. pp. 1-18, Mar. 2000.

"About Axial Clamping Force Monitoring at Power Transformer Windings During Their Active Lifetime," by Andrei Marinescu and Carmen Livia Ungureanu. Annals of the University of Craiova, Electrical Engineering Series, No. 32, 2008; ISSN 1842-4805.

"Transformer Winding Design—The Design and Performance of Circular Disc, Helical and Layer Windings for Power Transformer Applications," by David L. Harris, P.E. Minnesota Power Systems Conference, Nov. 3-5, 2009.

"Incipient Fault Detection in Transformers Using Fiber Optic Microbend Sensors," by Anup Jayaprakash Nambiar. Amrita School of Engineering Coimbatore, Tamil Nadu—641105 India (after 2006).

"Opsens White-Light Polarization Interferometry Technology," by Opsens Inc. Feb. 2009.

"Long-Life Fiber-Optic Pressure Sensor for Harsh Environment Applications," by Marek T. Wlodarczyk, Tom Poorman, Jacob Arnold and Terry Coleman. Optrand, Inc. Feb. 2001.

"Newly Developed Method for On-Line Monitoring of Oil Dielectric Breakdown Strength," by Tim Cargol. http://www.elp.com/index/display/article-display/301630/articles/utility-products/volome-3/issue-8/product-focus/preventive-maintenance. Aug. 2006.

"HV Power Transformer Direct Monitoring of Windings Axial Clamping Forces," by Andrei Marinescu, Ion Burciu, and Ion Patru. ICEMT Research-Development and Testing National Institute for Electrical Engineering, Craiova, 200515, Romania. Apr. 2006.

* cited by examiner

FIBER-GRATING SENSORS HAVING LONGITUDINAL-STRAIN-INDUCING JACKETS AND SENSOR SYSTEMS AND STRUCTURES INCLUDING SUCH SENSORS

RELATED APPLICATION DATA

This application claims the benefit of priority of U.S. Provisional Patent Application Ser. No. 61/816,466, filed on Apr. 26, 2013, and titled "TRANSVERSE FORCE SENSOR WITH TEMPERATURE COMPENSATION," which is incorporated by reference herein in its entirety.

FIELD OF THE INVENTION

The present invention generally relates to the field of fiber-grating sensors. In particular, the present invention is directed to fiber-grating sensors having longitudinal-strain-inducing jackets and sensor systems and structures including such sensors.

BACKGROUND

Fiber gratings are well known and have been used for measuring axial and transverse loads. Applications of these fiber gratings have been used primarily to measure strain fields in composite materials and in adhesive joints. To measure transverse loads, some conventional sensors rely on embodiments that apply transverse load on an optical fiber. The transverse load induces differential strain across the optical core. This causes the optical core to manifest two different effective indices of refraction and two "effective" fiber gratings spaced relative to the induced index of refraction difference. These principals have been applied to measure transverse strain/load in a variety of applications.

There are a number of significant issues with the conventional sensors that measure transverse load. One issue is that the amount of birefringence induced by small to moderate transverse loads is very small. Significant efforts are required to accurately read out these differences and that in turn drives up cost. An alternative is to mechanically amplify the transverse load. This results in larger sensors, increased cost, and in some cases a need for high precision in alignment and fabrication methods. For some applications in which transverse load sensors are subject to high electrical fields, it is important to eliminate air gaps. This requirement makes it more difficult to employ some conventional geometries, including geometries utilizing side-hole optical fibers.

SUMMARY OF THE DISCLOSURE

In one implementation, the present disclosure is directed to a sensor for measuring a compressive load, which includes a first optical fiber having a longitudinal axis designed and configured to be oriented perpendicularly to the compressive load during use of the sensor; a first Bragg grating applied to the first optical fiber; and a first longitudinal-strain-inducing jacket coupled to the first optical fiber and extending along the longitudinal axis, the first longitudinal-strain-inducing jacket selected and configured to induce increasing axial tensile strain in the first optical fiber at the first Bragg grating as a function of increasing magnitude of the compressive load.

In another implementation, the present disclosure is directed to an electrical transformer, which includes an electrical winding subject to a clamping load; and a transverse-pressure sensor engaged with the electrical winding so as to measure the clamping load, the transverse-pressure sensor comprising: first and second loading members having, respectively, first and second confronting faces defining a gap between the first and second loading members; a first optical fiber having a transverse-load-sensing region located in the gap and having a longitudinal axis; a first Bragg grating applied to the first optical fiber in the transverse-load-sensing region; and a first longitudinal-strain-inducing jacket coupled to the first optical fiber in the transverse-load-sensing region and extending along the longitudinal axis, the first longitudinal-strain-inducing jacket selected and configured to induce axial strain in the first optical fiber at the first Bragg grating as a function of change in the clamping load.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In some aspects, the present invention is directed to an optical-fiber-based sensor that includes an optical fiber, at least one Bragg grating applied to the optical fiber, and one or more longitudinal-strain-inducing (LSI) coatings, or other jacket(s), applied to the optical fiber. Each LSI jacket is selected for measuring a particular physical characteristic by inducing a longitudinal strain into the optical fiber at a corresponding Bragg grating. In the case of transverse load, the jacket elongates causing longitudinal strain through the action of an appropriately designed transducer. Examples of physical characteristics that a sensor of the present disclosure can be designed and configured to measure include, but not limited to, a load applied transverse the optical fiber, temperature, and presence and/or amount of a substance, such as moisture or a particular chemical analyte, and any combination thereof. By virtue of the nature of each LSI-jacket material itself and/or the nature of the physical structure(s) engaging the LSI jacket, the LSI jacket induces axial strain into the optical fiber in the region of the corresponding Bragg grating, allowing optical-based measurements to be made of the changes in the output of the optical fiber due to the deformation of the Bragg grating resulting from the induced axial strain. Specific exemplary LSI jackets for measuring transverse axial strain and for measuring presence of moisture are described herein. However, those skilled in the art will readily understand how to apply the broad functionalities underlying these sensors to devise other sensors using other LSI jackets.

Other aspects of this disclosure are directed to providing LSI-based sensors with built-in temperature compensation functionality to allow any measurement taken based on axial strain induced by an LSI jacket to be adjusted for the current temperature of the sensor when that measurement is made. Further aspects of the present disclosure are directed to sensor systems that include LSI-jacket-based sensors made in accordance with the present invention. Still further aspects of the present invention include structures, such as electrical transformers and transformer windings, that include such sensors and/or sensor systems integrated therein. These and other aspects of the present invention are described below in detail relative to a few exemplary embodiments, which illustrate not only specific examples, but also broad underlying features and functionalities of the present invention. Before turning to these exemplary embodiments, however, a brief background of fiber-grating-type transverse load sensors is first provided.

Figure 1A:
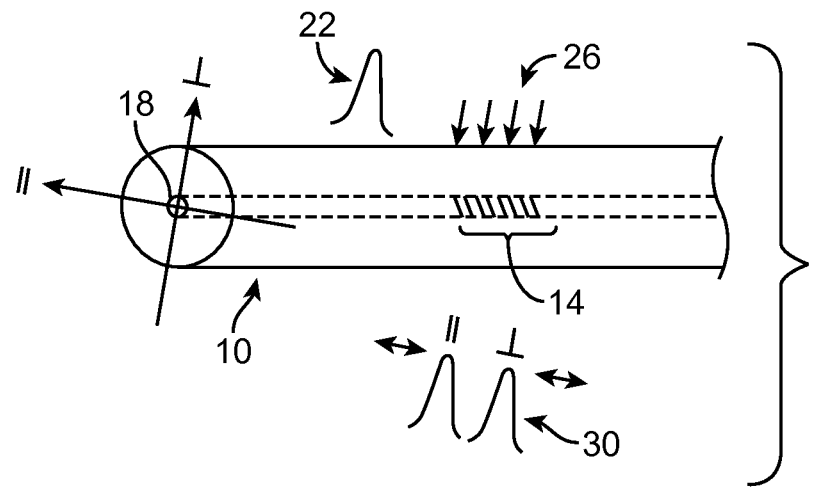
FIG. 1A is a diagram of a prior art uniform fiber grating written onto a single mode optical fiber, illustrating the optical fiber being subjected to uniform transverse load.

Fiber-based Bragg gratings are well known and have been used for measuring axial and transverse load. For example, FIG. 1A shows a prior-art optical fiber 10 that has a uniform fiber grating 14 written onto its core 18. In the absence of any transverse loading of optical fiber 10 and illumination of fiber grating 14 by a flat, wide-spectral-band light source, the reflection from the fiber grating is a single spectral peak 22. When fiber grating 14 is loaded sufficiently by a uniform transverse load 26 as in FIG. 1A, the single spectral peak 22 splits into two spectral peaks 30 due to birefringence of optical fiber 10 induced by the transverse load. That is, transverse load 26 induces differential strain across optical core 18. This in turn results into two different effective indices of refraction and two "effective" fiber gratings in core 18, with spacing that depends on the induced index of refraction difference. These principals have been applied to measure transverse strain/load in a variety of applications, notably the measurement of strain interior to composite materials and interior to adhesive joints.

Figure 1B:
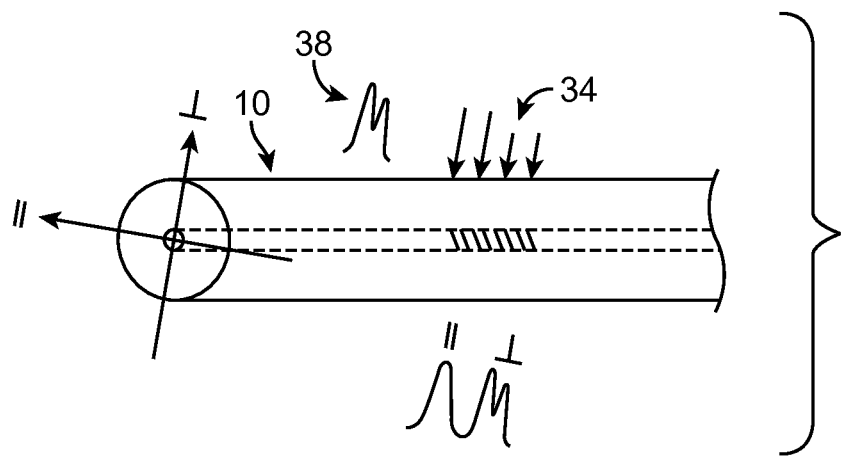
FIG. 1B is a diagram of a prior art uniform fiber grating written onto a single-mode optical fiber, illustrating the optical fiber being subjected to non-uniform transverse load.

FIG. 1B illustrates a case where a transverse load 34 is not uniform. The result is that the index of refraction along the length of optical fiber 10 varies and, consequently, the spectrum of the spectral peak 38 will be split. The spectral splits associated with prior-art fiber Bragg gratings can be quite small and may require spectrometers with high resolution to make measurements with sufficient accuracy for many applications. Alternative methods of enhancing the signal include special optical fiber geometries and mechanical enhancement methods that increase cost and complexity.

Figure 2:
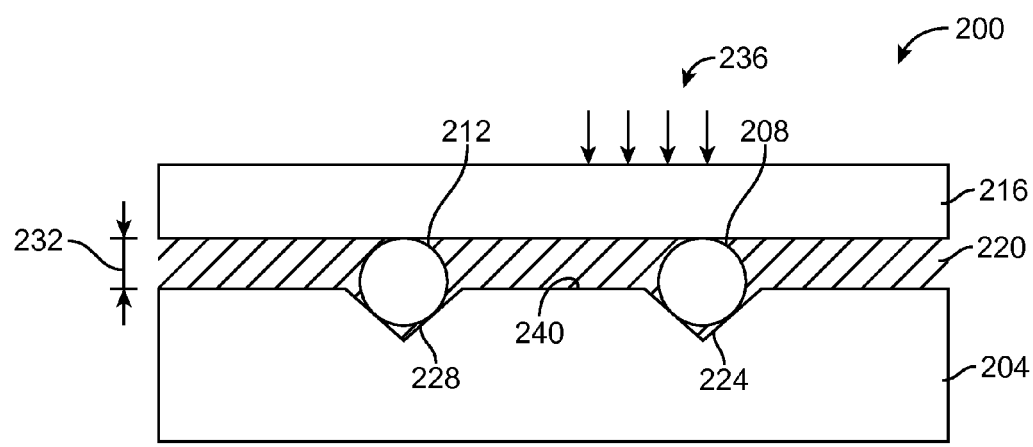
FIG. 2 is a transverse cross-sectional view of a dual-fiber V-groove-based transverse-load sensor assembly using uncoated fiber gratings.

To make a low cost and effective transverse-load sensor, the present inventor conducted investigations into utilizing V-groove assemblies associated with the telecommunication industry for transverse load sensors. FIG. 2 illustrates a transverse-load sensor assembly 200 used in these investigations. As seen in FIG. 2, assembly 200 includes a first transverse-load-applying structure 204 (here, a first plate), a first optical fiber 208, a load-balancing spacer 212 (here, a second optical fiber), a second transverse-load-applying structure 216 (here, a second plate), and a bonding material 220, such as an epoxy. It is noted that while first and second loading structures 204 and 216 are shown as plates, they may be another form, such as blocks, pads, etc. In some embodiments, first and second loading structures 204 and 216 may be integrated with first optical fiber 208 and load-balancing spacer 212 to make sensor assembly 200 a monolithic unit that is supplied separately from any structure(s) with which the assembly is used. In other embodiments, first and second loading structures 204 and 216 may be an integral part of a structure in which measurements are made. For example, a bearing assembly (not shown) for a bridge or other piece of public infrastructure may be made in a manner that first optical fiber 208 and load-balancing spacer 212 are integrated into the bearing assembly. Those skilled in the art will readily recognize the many other structures that can include integrated sensors of the present disclosure.

In the embodiment shown, first transverse-load-applying structure 204 includes a pair of recesses 224 and 228 (here, elongate V-grooves) that receive, respectively, first optical fiber 208 and load-balancing spacer 212 in a manner that, at least in an unloaded condition, provides a gap 232 between first and second transverse-load-applying structures 204 and 216. Initial tests were conducted using quartz for first transverse-load-applying structure 204. However, materials other than quartz, such as any of a variety of ceramics, may alternatively be used. In one example, first optical fiber 208 contains a fiber Bragg grating (not shown), and load-balancing spacer 212 provides balance to help ensure uniform transverse loading of the first optical fiber by first and second transverse-load-applying structures 204 and 216 when a transverse load 236 is applied to sensor assembly 200. It is noted that when load-balancing spacer 212 is a second optical fiber, it is possible to put fiber Bragg gratings in both optical fiber 208 and the second optical fiber at higher cost, which may in certain cases provide both redundancy and highly sensitive differential measurements. Exemplary applications where transverse-load-sensing fiber Bragg gratings in two (or more) optical fibers may be desirable are situations where severe temperature gradients are present. In the configuration shown in FIG. 2, recesses 224 and 228 have V-shaped transverse cross-sections, but in other embodiments, other transverse cross-sectional shapes, such as curved (e.g., circular, elliptical, parabolic, etc.), can be used. The diameters of optical fiber 208 and load-balancing spacer 212 are sufficiently large that each extends beyond the surface 240 of first transverse-load-applying structure 204 to provide gap 232. V-shaped transverse cross-sections for recesses 224 and 228 may be desirable due to the three-point contact that can result between first optical fiber 208 and first and second transverse-load-applying structures 204 and 216. Bonding material 220 may be, for example, an epoxy or other suitable material.

When transverse load 236 is applied across first and second transverse-load-applying structures 204 and 216, spectral splitting occurs that can in turn be used to measure the transverse load. In order to have very distinct spectral splits with a transverse load, such as load 236, it is important that gap 232 be very uniform and that first and second recesses 224 and 228 are smooth and uniform as possible. Extraneous spectral splitting will occur if the transverse loading is not uniform along the fiber length, as is illustrated by FIG. 1B.

Figure 3:
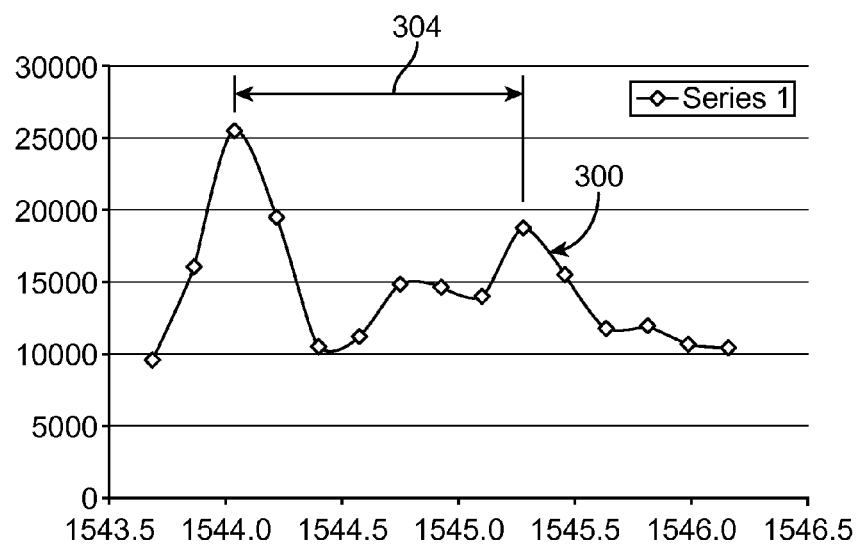
FIG. 3 is a graph of the spectral response of a 10 mm×4 mm fiber-grating transverse-load sensor similar to the sensor shown in FIG. 2 wherein the sensor is engaged by a 2 inch diameter cylinder exerting a transverse load of 400 psi.

The present inventor made sensors based on sensor assembly 200 of FIG. 2 using bare optical fibers for optical fiber 208 and load-balancing spacer 212. FIG. 3 is a graph of the spectral response of an instantiation of sensor assembly 200 in which second transverse-load-applying structure 216 was approximately 4 mm×10 mm in plan area (e.g., in the plane of face 240) and when the sensor assembly was loaded with a two-inch-diameter cylinder to approximately 400 psi (~2.758 MPa). The dual-peak nature of the spectral response curve 300 is apparent, and the overall peak-to-peak separation 304 can be used to extract a transverse load measurement. Although care has been taken to ensure flatness, it is apparent that the transverse strain fields are not uniform, which can complicate interpretation of the results.

Figure 4A:
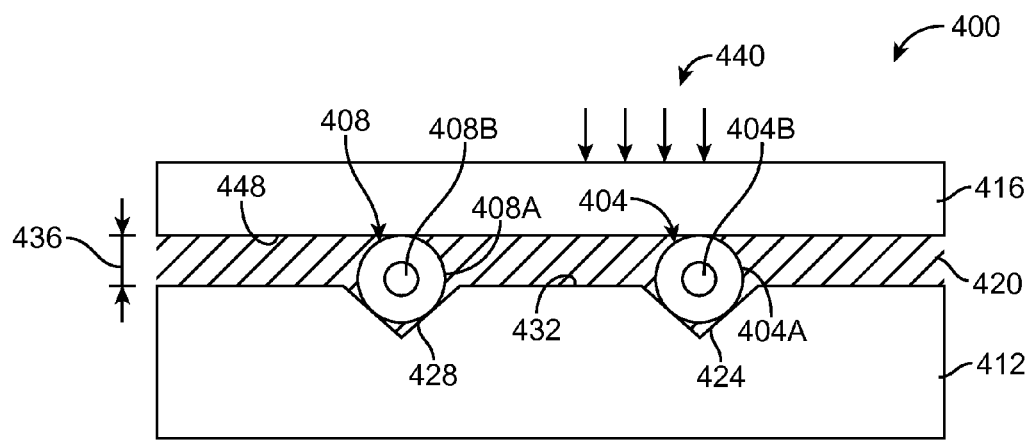
FIG. 4A is a transverse cross-sectional view of a transverse-load sensor assembly that includes an optical fiber having a longitudinal-strain-inducing (LSI) jacket that converts transverse load to axial strain in the optical fiber.
Figure 4B:
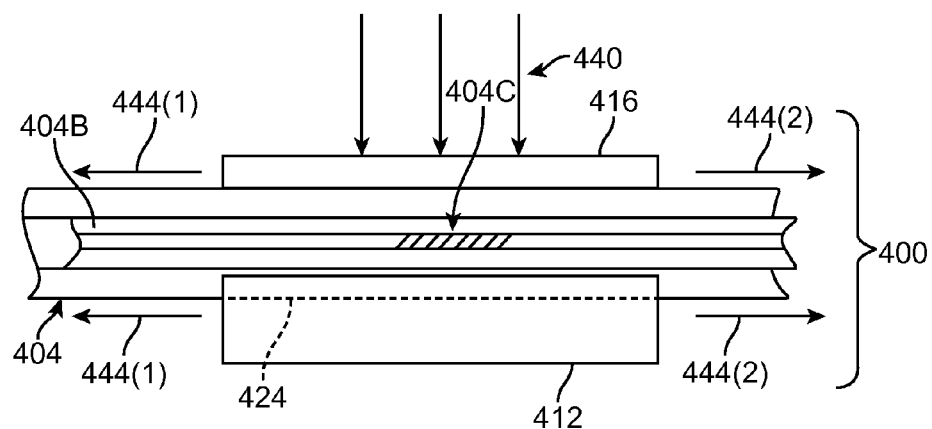
FIG. 4B is longitudinal cross-sectional view of the transverse-load sensor assembly of FIG. 4A, illustrating an operating principle of the assembly.

FIGS. 4A and 4B illustrate an alternative transverse load-sensing sensor assembly 400 that has major novel improvements to the basic configuration of sensor assembly 200 of FIG. 2. In embodiment of FIGS. 4A and 4B, sensor assembly 400 has elements similar to assembly 200 of FIG. 2, except that (1) the bare optical fibers of first optical fiber 208 and the second optical fiber of load-balancing spacer 212 are replaced by jacketed fibers 404 and 408, respectively, each having a corresponding LSI jacket 404A and 408A encasing the optical fibers 404B and 408B, respectively and (2) load bearing channels 428 and 424 are designed and configured so that the transverse force 440 causes the coatings 408 and 404 to elongate axially. In some embodiments, each optical fiber 404B and 408B may be a single-mode fiber having a quartz cladding. As a specific, non-limiting example, each optical fiber 404B and 408B may be a conventional optical fiber having a 125-micron diameter and an 8-micron to 10-micron diameter core. Optical fibers having other configurations and dimension may be used. LSI jackets 404A and 408A are applied, respectively, to optical fibers 404B and 408B. In one specific, non-limiting example, each jacket 404A and 408A has a thickness of about 35 microns. Other thicknesses can be used to suit a particular application and particular material selected for each jacket. For example, the thickness and material of each jacket 404A and 408A may be selected as a function of (1) the range of loadings that sensor assembly 400 is designed for measuring, (2) the configurations of other components of the sensor assembly, such as first and second transverse load-applying structures 412 and 416, and (3) the mechanical properties, such as modulus of elasticity, of the material(s) selected for the jackets. In addition, the material(s) of jackets 404A and 408B may also be selected as a function of the range of loading that sensor assembly 400 is designed for measuring and the configurations of first and second transverse load-applying structures 412 and 416. In some embodiments, each LSI jacket 404A and 408A may comprise a ceramic coating, such as an organically modified ceramic material, for example, an organically modified ceramic material referred to under the trademark ORMOCER®, which is owned by the Fraunhofer Gesellschaft zur Forderung der angewandten Forschung e.V., Munich, Germany.

As with sensor assembly 200 of FIG. 2, sensor assembly 400 of FIG. 4 includes first and second transverse-load-applying structures 412 and 416 and a bonding material 420 bonding all of the components of the assembly together with one another. First transverse-load-applying structure 412 includes a pair of recesses 424 and 428, here V-shaped grooves, that receive, respectively, jacketed optical fibers 404 and 408 and are designed so that they have sufficient width and depth to accommodate the jacketed fibers in a manner that the jacketed fibers extend beyond the face 432 of the first transverse-load-applying structure so that first and second transverse-load-applying structures 412 and 416 define a gap 436 that allows first and second jackets 404A and 408A to bear a significant amount of any transverse loading, such as transverse loading 440, applied to sensor assembly 400. The materials and configurations of first and second transverse-load-applying structures 412 and 416 may be the same as or similar to the materials mentioned above in connection with FIG. 2.

When transverse load 440 is applied to sensor assembly 400, each of LSI jackets 404A and 408A deforms and exerts a longitudinal strain on corresponding optical fibers 404B and 408B. As seen in FIG. 4B relative to jacketed fiber 404, application of transverse loading 440 causes LSI jacket 404A to compress and, consequently, squash the material of the jacket somewhat out from between first and second transverse-load-applying structures 412 and 416 (as illustrated by arrows 444(1) and 444(2), thereby inducing a tensile strain into core 404B, which includes a suitable fiber Bragg grating 404C (see FIG. 4B). The induced tensile strain in fiber core 404B causes Bragg grating 404C to deform, resulting in a spectral shift in measurement light (not shown) toward longer wavelengths that could be measured.

Several cycles were made on an instantiation of sensor assembly 400, with runs up to values of 1500 psi for transverse load 440. In this instantiation, the diameter of each optical fiber 404B and 408B was 125 microns, each fiber had a corresponding LSI jacket 404A and 408A of a 35-microns thick coating of an ORMOCER® ceramic, fiber Bragg grating 404C was 8-mm-long, first and second transverse-load-applying structures 412 and 416 were quartz, the plan area of second transverse-load-applying structure 416 was 10 mm×4 mm, and the plan area of first transverse-load-applying structure 412 was approximately 14 mm×4 mm, with an area designed for strain relief. In the test instantiation, the depth of each of first and second V-shaped recesses 424 and 428 was designed to have a depth that would result in a 125-micron-diameter bare optical fiber being just contained in the corresponding V-shaped recess and the face 448 of second transverse-load-applying structure 416 just being in contact with the bare optical fiber. The action of each jacketed fiber 404 and 408 with corresponding ceramic-coating jacket 404A and 408A under transverse load 440 was that the ceramic jackets elongated along the length of the V-groove assembly (again, as indicated by arrows 444(1) and 444(2) of FIG. 4B), thereby exerting longitudinal strain on the jacketed fibers and Bragg grating 404C. During testing, the described instantiation of transverse-load sensor assembly 400 was placed in a hydraulic loader (not shown) having temperature-controlled top and bottom plates, which were used to run tests at each of 25° C., 50° C., and 100° C. The loader was used to exert loads up to 2000 psi (13.79 MPa) on a two-inch diameter cylinder. The loader in turn drove flat aluminum plates that exerted much higher transverse load on sensor assembly 400 due to the smaller size of the tested sensor assembly 400.

Figure 5A:
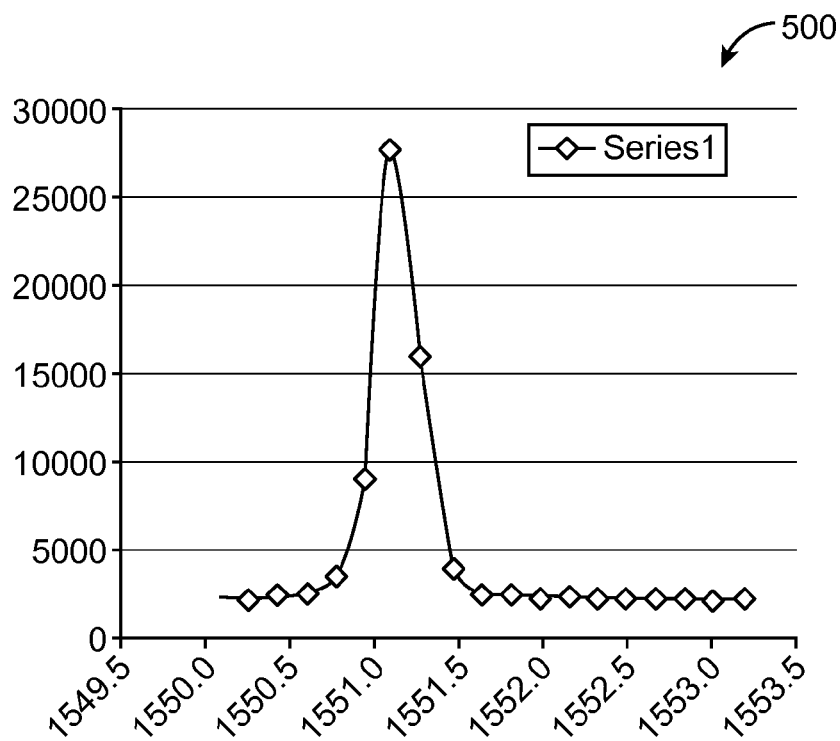
FIG. 5A is a graph of the spectral response of an instantiation of the sensor assembly of FIGS. 4A and 4B, unloaded at 100 C.
Figure 5B:
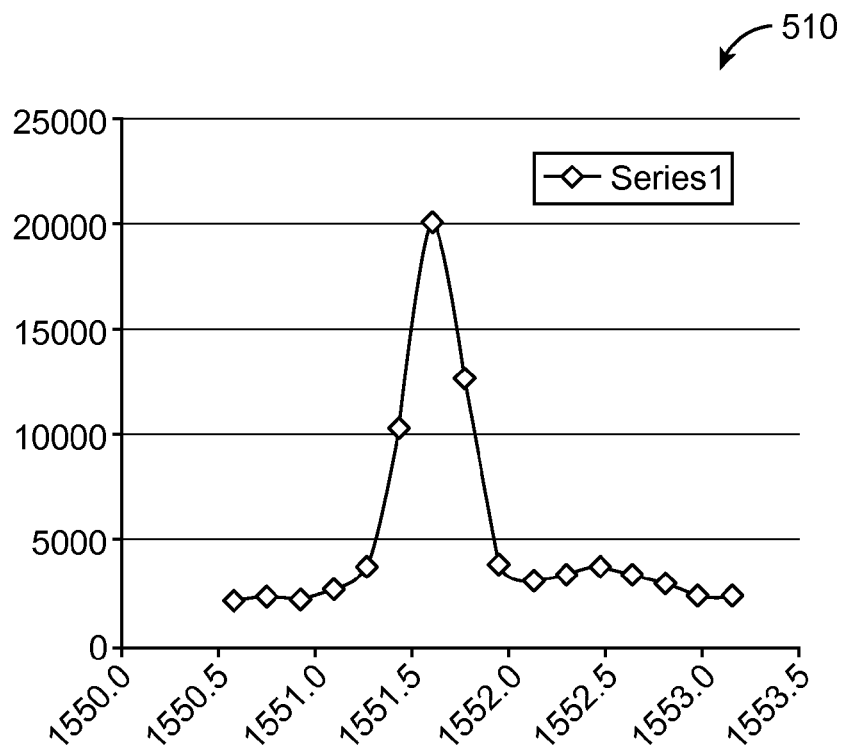
FIG. 5B is a graph of a spectral response of the sensor-assembly instantiation corresponding to FIG. 5A, loaded by a two inch diameter cylinder at 200 psi (~1.379 MPa), at 100° C.
Figure 5C:
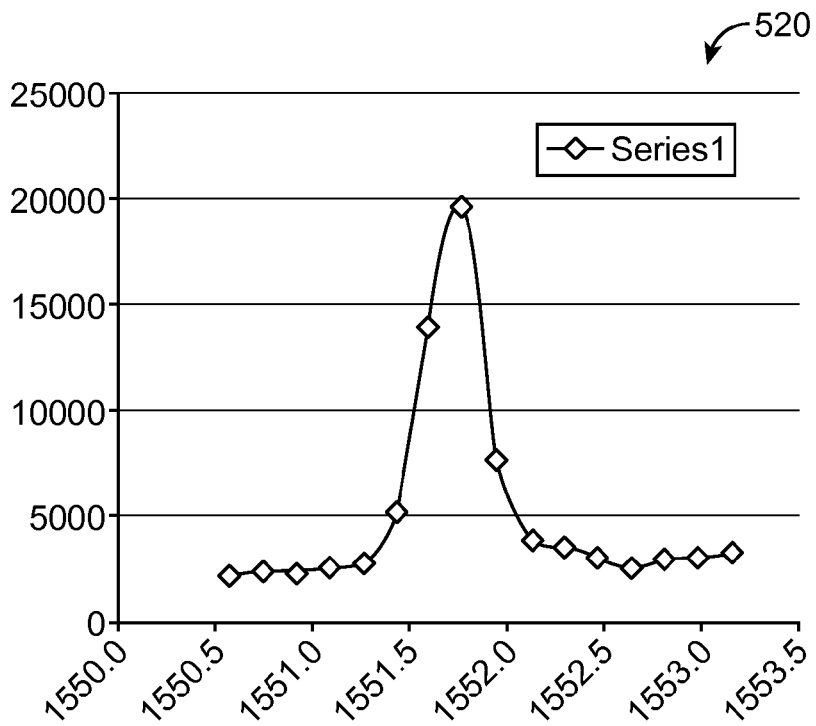
FIG. 5C is a graph of a spectral response of the sensor-assembly instantiation corresponding to FIG. 5A, loaded by the two inch diameter cylinder at 400 psi (~2.758 MPa), at 100° C.
Figure 5D:
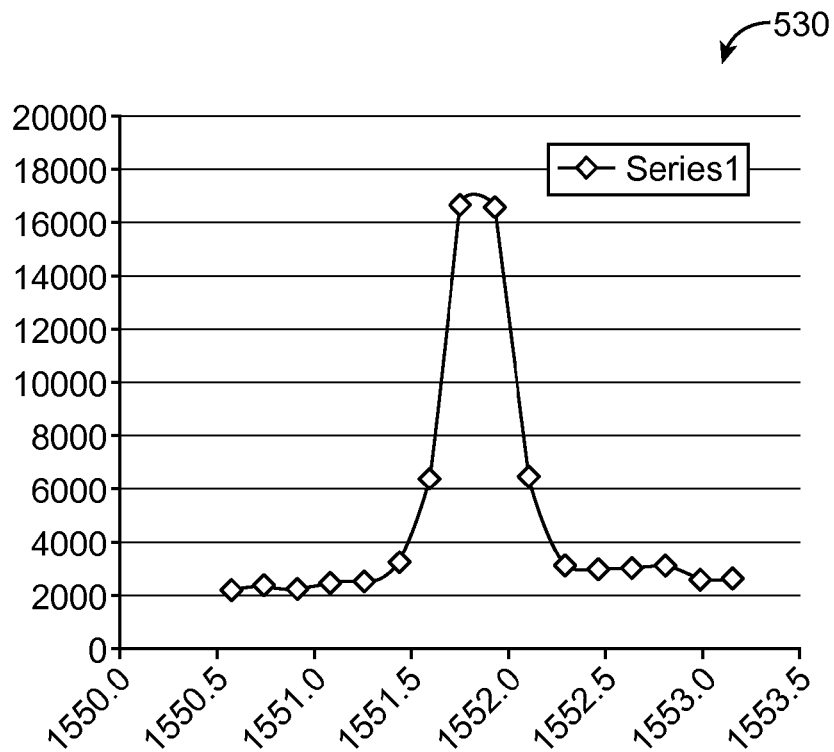
FIG. 5D is a graph of a spectral response of the sensor-assembly instantiation corresponding to FIG. 5A, loaded by the two inch diameter cylinder at 600 psi (~4.137 MPa), at 100° C.
Figure 5E:
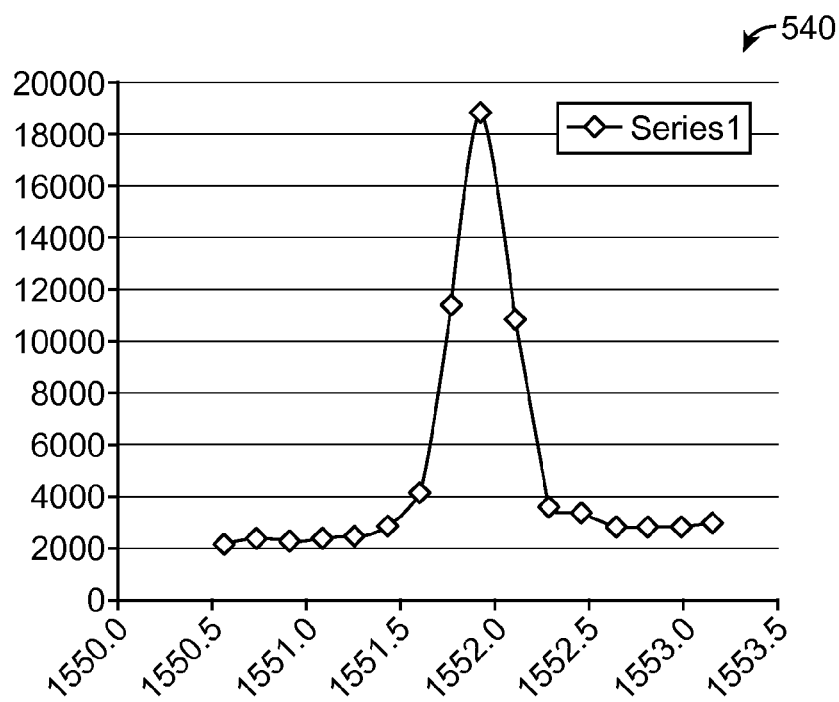
FIG. 5E is a graph of a spectral response of the sensor-assembly instantiation corresponding to FIG. 5A, loaded by the two inch diameter cylinder at 800 psi (~5.516 MPa), at 100° C.
Figure 5F:
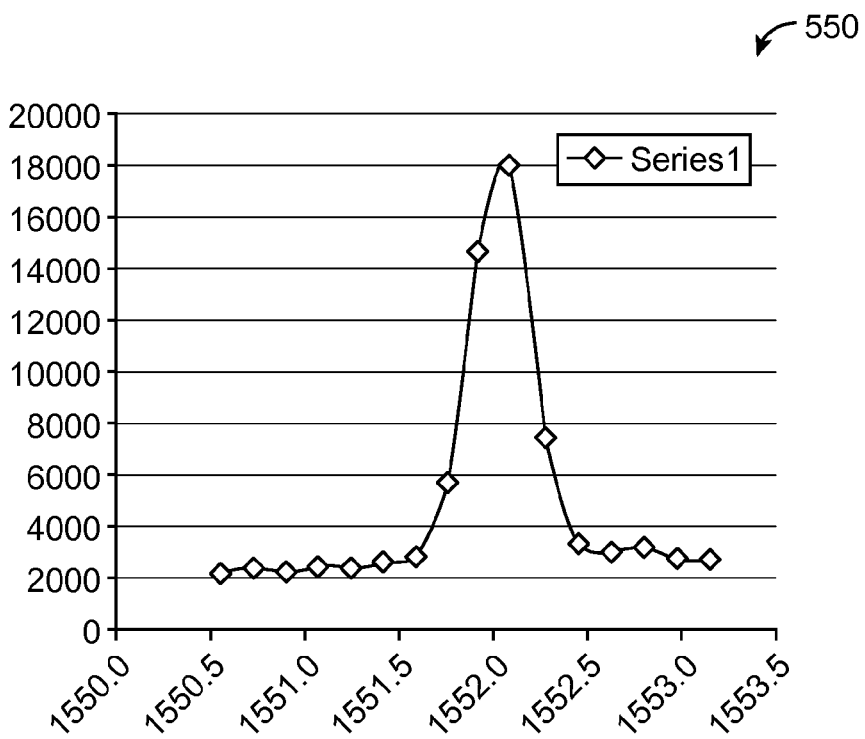
FIG. 5F is a graph of a spectral response of the sensor-assembly instantiation corresponding to FIG. 5A, loaded by the two inch diameter cylinder at 1000 psi (~6.895 MPa), at 100° C.

FIG. 5A-5F show the spectra collected from various test runs on the fabricated instantiation of transverse-load sensor assembly 400 of FIGS. 4A and 4B. FIG. 5A is graph 500 of sensor assembly 400 unloaded at 100° C. FIG. 5B is a graph 510 when sensor assembly 400 was loaded by the two inch diameter cylinder operating at 200 psi and at 100° C. FIG. 5C is a graph 520 of sensor assembly 400 loaded by the two inch diameter cylinder operating at 400 psi and at 100° C. FIG. 5D is a graph 530 of sensor assembly 400 loaded by the two inch diameter cylinder operating at 600 psi and at 100° C. FIG. 5E is a graph 540 of sensor assembly 400 loaded by the two inch diameter cylinder operating at 800 psi and at 100° C. FIG. 5F is a graph 550 of sensor assembly 400 loaded by the two inch diameter cylinder at 1000 psi and at 100° C. In each case there is a very clean single spectral peak that allows rapid and accurate transverse load measurements based on longitudinal strain.

Figure 6:
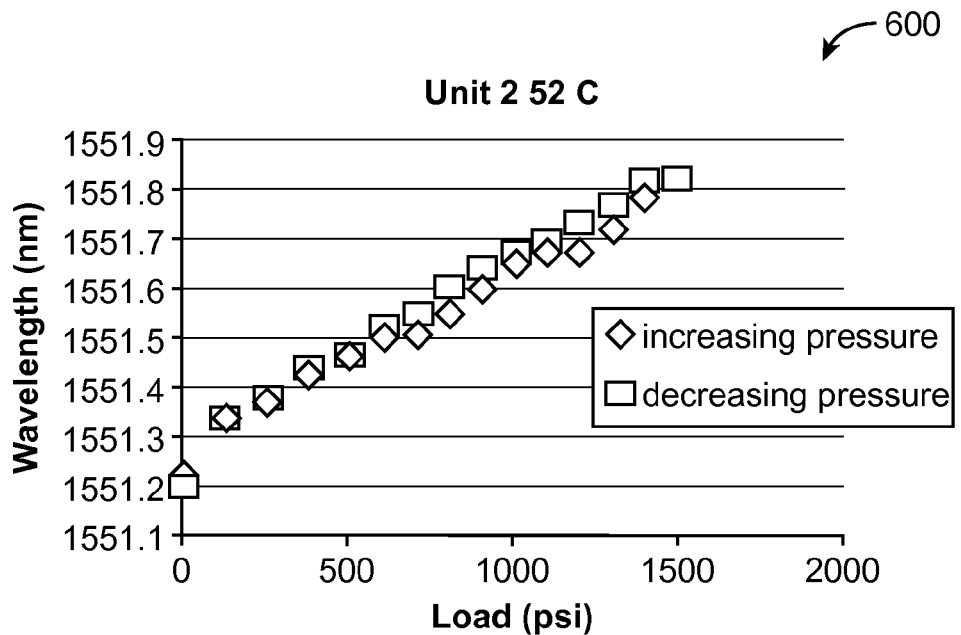
FIG. 6 is a graph of wavelength versus transverse load for an instantiation of the sensor assembly of FIGS. 4A and 4B, for transverse loadings increasing from 0 psi (0 MPa) to 1500 psi (~10.342 MPa) and then decreasing from 1500 psi (~10.342 MPa) to 0 psi (0 MPa), at 52° C.
Figure 7:
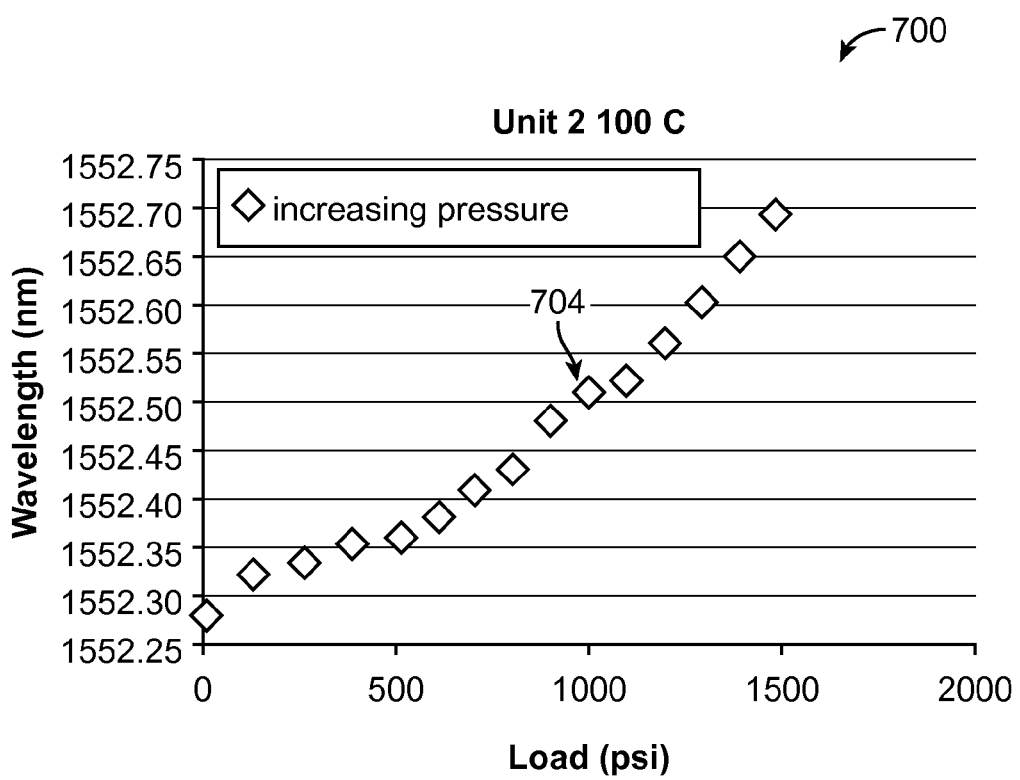
FIG. 7 is a graph of wavelength versus transverse load for the instantiation corresponding to FIG. 6, for transverse loadings increasing from 0 psi (0 MPa) to 1500 psi (~10.342 MPa), at 100° C.

FIG. 6 illustrates a graph 600 of wavelength versus load for a test instantiation of sensor assembly 400 of FIGS. 4A and 4B with transverse loading, applied by the two-inch diameter loader at 52° C., being increased from 0 psi (0 MPa) to 1500 psi (~10.342 MPa) and then decreased from 1500 psi (~10.342 MPa) back to 0 psi (0 MPa). The load applied on the upward cycle was applied continuously and adjusted incrementally upward to 1500 psi (~10.342 MPa). On the downward cycle, it was found that it was necessary to unload and reload the sensor completely for each pressure load. FIG. 7 illustrates a graph 700 of wavelength versus load for the same test instantiation of sensor assembly 400 of FIGS. 4A and 4B with transverse loading, applied at 100° C., being increased from 0 psi (0 MPa) to 1500 psi (~10.342 MPa). The algorithm used to generate curve 704 of graph 700 was a simple average of the wavelength at a power level of 15000 counts. More sophisticated algorithms that integrate under curve 704 may improve results.

Figure 8:
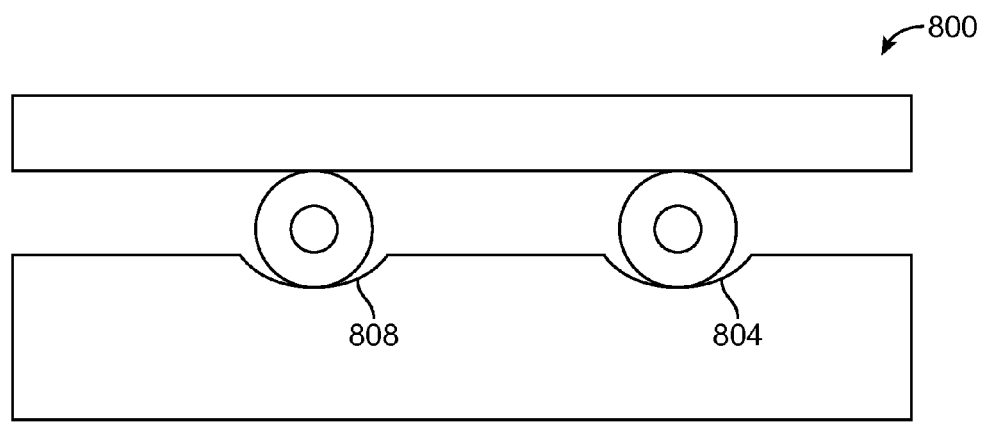
FIG. 8 is a transverse cross-sectional view of an LSI-jacket-based transverse-load sensor assembly of the present invention that utilizes recesses having arcuate transverse cross-sections instead of V-shaped cross-sections.
Figure 9:
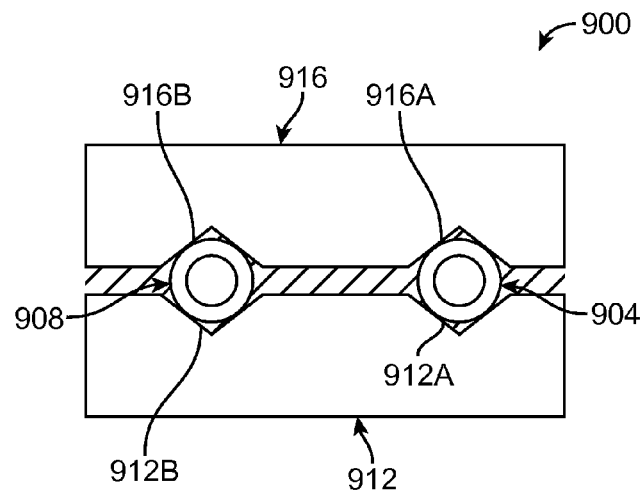
FIG. 9 is a transverse cross-sectional view of an LSI-jacket-based transverse-load sensor assembly of the present invention that utilizes recesses on both the first and second transverse-load-applying structures, wherein the recesses have V-shaped transverse cross-sections.
Figure 10:
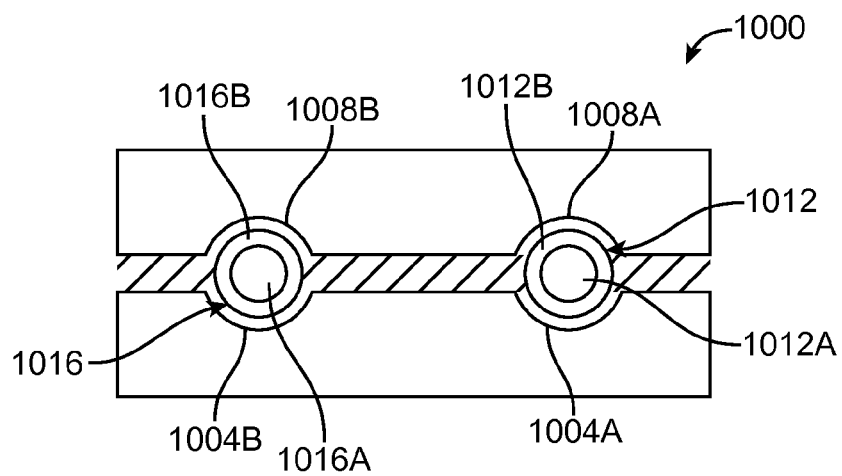
FIG. 10 is a transverse cross-sectional view of an LSI-jacket-based transverse-load sensor assembly of the present invention that utilizes recesses on both the first and second transverse-load-applying structures, wherein the recesses have arcuate transverse cross-sections.

It is noted that the LSI-jacket-based transverse-load sensors that "convert" transverse load to longitudinal strain can also be realized using geometries and/or configuration different from the geometries and configuration of sensor assembly 400 illustrated in FIGS. 4A and 4B. As a first example, FIG. 8 illustrates an LSI-jacket-based transverse-load sensor assembly 800 in which V-shaped recesses 424 and 428 of sensor assembly 400 of FIG. 4A are replaced by arcuate recesses 804 and 808, respectively, of FIG. 8. The other components and features of sensor assembly 800 can be the same as or similar to sensor assembly 400 of FIGS. 4A and 4B. As another example, FIG. 9 illustrates an LSI-jacket-based transverse-load sensor assembly 900 that includes first and second jacketed optical fibers 904 and 908 and first and second transverse-load-applying structures 912 and 916 that each include a pair of recesses 912A, 912B, 916A, and 916B that receive portions of the corresponding respective ones of the first and second optical fibers. The depths of recesses 912A, 912B, 916A, and 916B do not have to be the same as one another and many different combinations are possible for optimum performance under specific environmental conditions. Transverse-load sensor assembly 900 of FIG. 9 illustrates that for each LSI-jacketed fiber both of the first and second transverse-load-applying structures may include a corresponding recess having a V-shaped transverse cross-section. Similarly, FIG. 10 illustrates an LSI-jacket-based transverse-load sensor assembly 1000 also having two recesses 1004A, 1008A, 1004B, and 1008B for each jacketed fiber 1012 and 1016, but in FIG. 10 the recesses each have arcuate transverse cross-sectional shapes. Curvatures of recesses 1004A, 1008A, 1004B, and 1008B can be adjusted to vary the conversion of transverse load to longitudinal strain on each optical fiber 1012A, 1016A through the action of the corresponding jacket 1012B, 1016B. It is noted that in sensor assemblies 900 and 1000 of FIGS. 9 and 10, components not particular pointed out and described may be the same as or similar to like components of sensor assembly 400 of FIGS. 4A and 4B.

Figure 11:
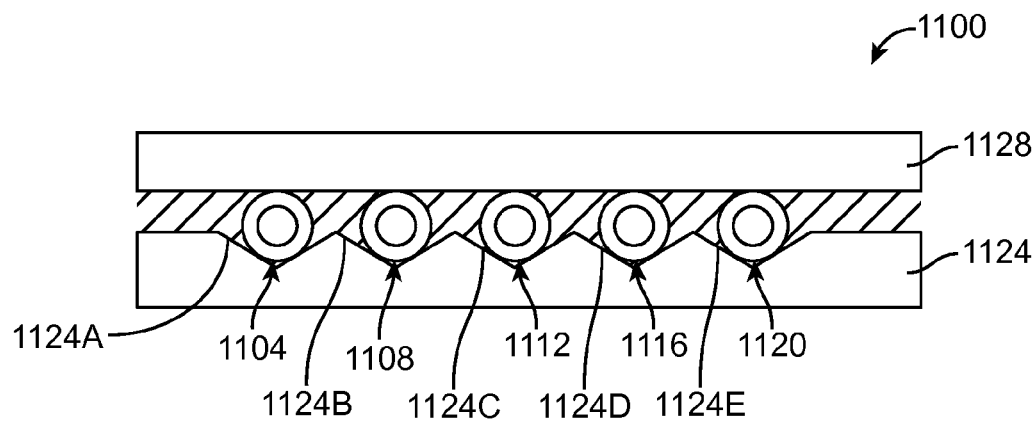
FIG. 11 is a transverse cross-sectional view of an LSI-jacket-based transverse-load sensor assembly of the present invention that utilizes a plurality of jacketed-fiber-type load-balancing spacers.

As another example of variation of geometries and/or configuration, FIG. 11 illustrates an LSI-jacket-based transverse-force sensor assembly 1100 that includes five LSI-jacketed optical fibers 1104, 1108, 1112, 1116, and 1120 instead of only two as appears in the embodiments of FIGS. 2, 4A, 4B, and 8-10. At least one of jacketed optical fibers 1104, 1108, 1112, 1116, and 1120 includes a fiber Bragg grating (not shown) for the purpose of measuring strain induced into that optical fiber by a transverse load (not shown) applied to sensor assembly 1100 in the manner described above relative to sensor assembly 400 of FIGS. 4A and 4B. Each jacketed optical fiber 1104, 1108, 1112, 1116, and 1120 not including a fiber Bragg grating may be provided for optimally adjusting the performance of sensor assembly 1100 by allowing the load transmitted by the optical fibers between the two transverse-load-applying structures 1124 and 1128 to be adjusted. For example, the load can be adjusted by modifying the surface area of transverse-load-applying structures 1124 and 1128, the length of jacketed optical fibers 1104, 1108, 1112, 1116, and 1120 between the transverse-load-applying structures, and the number of optical fibers in sensor assembly 1100. It is noted that it is possible to place a temperature-sensing fiber grating and/or a transverse load sensing fiber grating in any or all of the optical fibers 1104, 1108, 1112, 1116, and 1120. For lowest possible cost, it is anticipated that only one optical fiber will contain a grating. However redundancy and performance issues may, for some applications, make desirable additional fiber gratings for transverse-load and/or temperature sensing. In the embodiment shown, first transverse-load-applying structure 1124 includes five recesses 1124A to 1124E, (here all V-shaped), one for each of jacketed optical fibers 1104, 1108, 1112, 1116, and 1120. As those skilled in the art will readily appreciate, more or fewer than five jacketed fibers 1104, 1108, 1112, 1116, and 1120 and/or corresponding recesses 1124A to 1124E may be used as desired/needed for a particular application.

Figure 12:
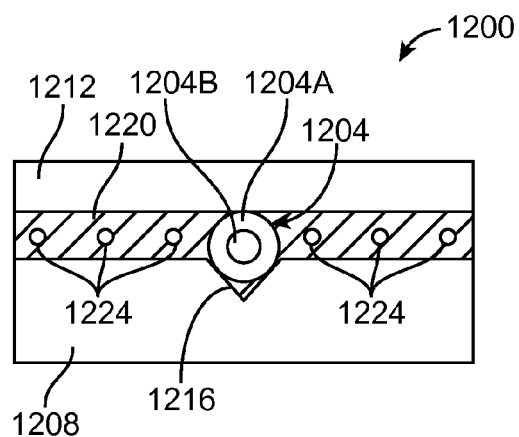
FIG. 12 is a transverse cross-sectional view of an LSI-jacket-based transverse-load sensor assembly of the present invention that utilizes non-fiber-type load-balancing spacers.

FIG. 12 illustrates an LSI-jacket-based transverse-load sensor assembly 1200 that utilizes a single LSI-jacketed optical fiber 1204, unlike the examples of FIGS. 4A, 4B, and 8-11 that utilize two or more jacketed optical fibers. In addition to single jacketed optical fiber 1204, sensor assembly 1200 includes first and second transverse-load-applying structures 1208 and 1212, with the jacketed optical fiber 1204 engaged in a recess 1216 that may have, for example, a V-shaped transverse cross-section. Jacketed optical fiber 1204 may be held in place by an adhesive material 1220, such as an epoxy containing load-balancing spacers 1224. In one embodiment, load-balancing spacers 1224 may be spherical balls, for example, made of glass and having the same or differing diameters. Load-balancing spacers 1224 may be used to determine the minimum spacing between first and second transverse-load-applying structures 1208 and 1212. This spacing action in combination with the thickness of the jacket 1204A, the depth of recess 1216, and the diameter of the optical fiber core 1204B, may determine the range of the response of sensor assembly 1200. While a single optical fiber grating may be used to minimize costs, one or more additional fiber gratings could be used to measure multiple loads between a pair of transverse-load-applying structures.

Temperature measurement and compensation abilities may also be designed into an LSI-jacket-based sensor made in accordance with the present disclosure in any of several manners. One manner of doing this is to configure two fiber gratings in an optical fiber core in line with one another and at differing wavelengths. One of the gratings would be located so that is under load when a transverse load is applied to the sensor as described above, while the second grating is located to be isolated from the transverse load. An example of this is described below in connection with FIG. 13. A second manner of incorporating temperature measurement and compensation is to write a single fiber grating into a birefringent optical fiber, which may be a commercial polarization-preserving optical fiber, such as made by Fibercore, Southampton Science Park, United Kingdom, and Nufern, East Granby, Conn., among other manufacturers. This results in the fiber grating having two spectral peaks. When axial strain is applied to this type of optical fiber, the position of the two spectral peaks may be determined and longitudinal strain and temperature may be measured. By placing this type of fiber under transverse load in the designs associated with FIGS. 4A, 4B, and 8-12, above, by replacing each of the transverse-load sensing fiber optic cores with a birefringent optical fiber core, the longitudinal strain can be used to measure transverse load and temperature simultaneously. U.S. Pat. No. 6,335,524, titled "HIGH-SPEED DEMODULATION SYSTEMS FOR FIBER OPTIC GRATING SENSORS," issued on Jan. 1, 2002, to Udd and Weisshaar, which is incorporated herein by reference for its pertinent teachings, provides a description of how to use polarization preserving optical fiber to make multi-dimensional strain and temperature measurements including the case for simultaneous measurement of axial strain and temperature. Coefficients for inversion of the two by two matrix needed to covert spectral measurements into axial strain and temperature are given in this patent for a commercial Fibercore polarization-preserving optical fiber.

Figure 13:
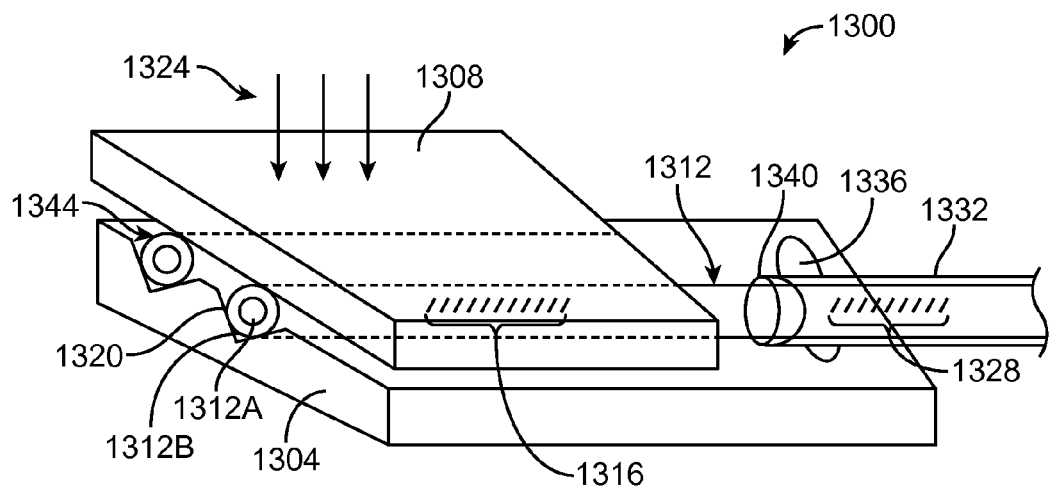
FIG. 13 is an isometric view of an LSI-jacket-based transverse load sensor that incorporates a second fiber grating within a strain relief tube.

FIG. 13 illustrates an LSI-jacket-based transverse-load sensor 1300 of the present disclosure that incorporates temperature measurement and compensation features according to the first manner noted above. In this example, sensor 1300 includes first and second transverse-load-applying structures, here first and second load plates 1304 and 1308, an LSI jacketed optical fiber 1312, and a first fiber grating 1316 written into the optical fiber 1312A that is designed to operate at a first wavelength and is located in the optical fiber so that it is between the first and second load plates and contained in a V-groove 1320 in the second load plate. When a transverse load 1324 is applied to second load plate 1308 with first load plate 1304 constrained, the LSI jacket 1312B of jacketed optical fiber 1312 is partially extruded under the transverse loading and, as a result, induces into the optical fiber at first fiber grating 1316 a longitudinal strain that is proportional to the transverse load. A second fiber grating 1328, designed and configured to operate at a second wavelength different from the first wavelength and written onto optical fiber 1312A is located to isolate it from the strain induced into optical fiber 1312A by transverse load 1324. In the embodiment shown, second fiber grating 1328 is located in a protective strain-relief tube 1332, which in this example is attached to first load plate 1304, for example, using an epoxy 1336. In order to prevent epoxy or other bonding agents from flowing along jacketed optical fiber 1312 to strain-relieved, second fiber grating 1328, a sealing agent 1340 may be used to inhibit flow during manufacturing of sensor 1300. An example material that can be used as sealing agent 1340 is a room-temperature-vulcanizing (RTV) sealant available from Dow Corning Corporation, Midland, Mich. As with other embodiments disclosed herein, a second LSI-jacketed optical fiber 1344 is provided to match to sensing LSI-jacketed optical fiber 1312 to balance the loading of first and second load plates 1304 and 1308.

Figure 14:
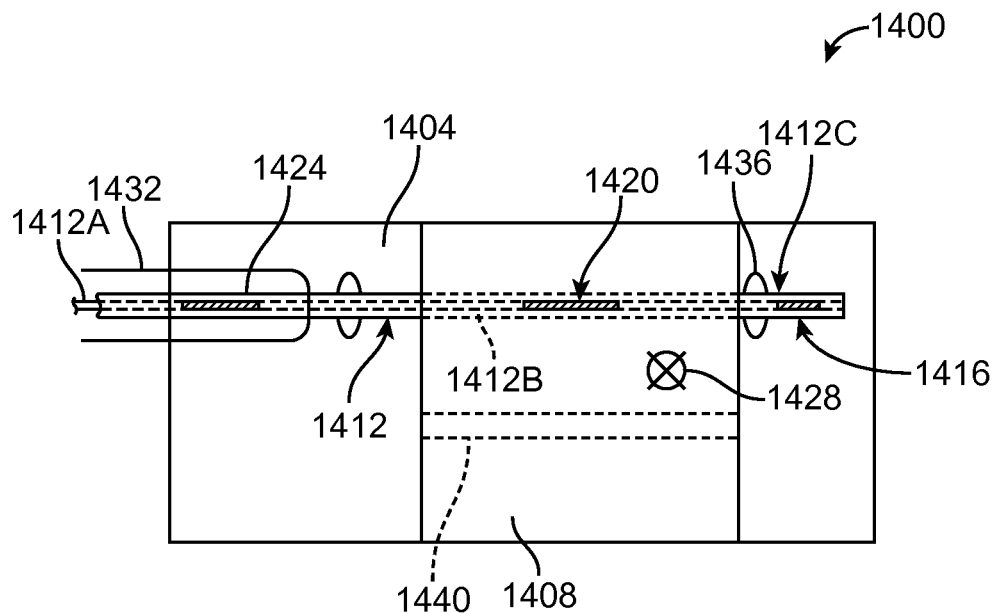
FIG. 14 is a plan view of an LSI-jacket-based transverse-load sensor designed with temperature compensation and the ability to measure water or chemical content.

In addition, alternatively, to measuring transverse load or transverse load and temperature, a sensor of the present invention may be configured, for example, to detect/measure moisture presence/content and/or chemical presence/content. FIG. 14 illustrates a sensor 1400 that is designed and configured to measure transverse loads, temperature, and moisture content. That said and as just alluded to, a sensor of the present invention can be configured to measure fewer than these three physical characteristics. For example, a sensor of the present invention can be designed and configured to measure only one of these three physical characteristics or any two out of the three characteristics as a particular application may require. Referring again to FIG. 14, in the embodiment shown LSI-jacket-based sensor 1400 includes first and second transverse-load-applying structures, here load plates 1404 and 1408 and an LSI-jacketed optical fiber 1412 that includes an optical fiber 1412A that contains three fiber gratings, a first grating 1416 for measuring water or chemical content, a second grating 1420 for measuring transverse load, and a third fiber grating 1424 for measuring temperature and allowing for temperature compensation. Each of fiber gratings 1416, 1420, and 1424 is designed to operate at a first, second, or third wavelength, respectively, that is separate and distinct from the other two of the first, second, and third wavelengths. The first, second, and third wavelengths are sufficiently separated so that, during operation, wavelength shifts due to environmental effects do not cause fiber gratings 1416, 1420, and 1424 to have overlapping spectral content. Transverse-load-sensing, second fiber grating 1420 and isolated temperature-sensing, third grating 1424 behave in manners similar to the manners described above in association with the FIGS. 4A, 4B, and 8-13. For example, second fiber grating 1420 is located between first and second load plates 1404 and 1408 and is jacketed by a suitable first LSI-jacketing material to form a first LSI jacket 1412B, such as an ORMOCER® material as described above, and third fiber grating 1424 is located to be isolated from any strain that may be induced into jacketed optical fiber 1412 by a transverse load 1428, such as by being located in a strain-isolation tube 1432.

Moisture- or chemical-sensing, first fiber grating 1416 is located out from between first and second load plates 1404 and 1408 and in a location where it would be exposed to the moisture or chemical desired to be sensed when sensor 1400 is installed in its operating environment (not shown). First fiber grating 1416 is jacketed by a suitable second LSI-jacketing material to form a second LSI jacket 1412C, such as a material that expands in the presence of the moisture or chemical so as to induce longitudinal strain into optical fiber core 1412A, thereby elongating or compressing first fiber grating 1416. As a specific example, second LSI jacket 1412C may comprise a polyimide that expands and contracts as water content changes. This action of second LSI jacket 1412C causes longitudinal strain changes and a wavelength shift in the light of the first wavelength that can be used to measure water or chemical content. The polyimide material may be applied to fiber optic core 1412A by stripping off any coating already in the region of first fiber grating 1416, or in a case of a coating that may have good strain transfer properties the same as or similar to an ORMOCER® material, it could be applied to that coating. A barrier 1436, such as an RTV sealant, may be provided to prevent adhesive (not shown) from between first and second load plates 1404 and 1408 from bonding to the moisture- or chemical-sensitive, first fiber grating 1416. In the manner of other transverse-force-sensing sensors disclosed herein, a load-balancing optical fiber 1440 may be placed between first and second load plates 1404 and 1408 for load balance.

Figure 15:
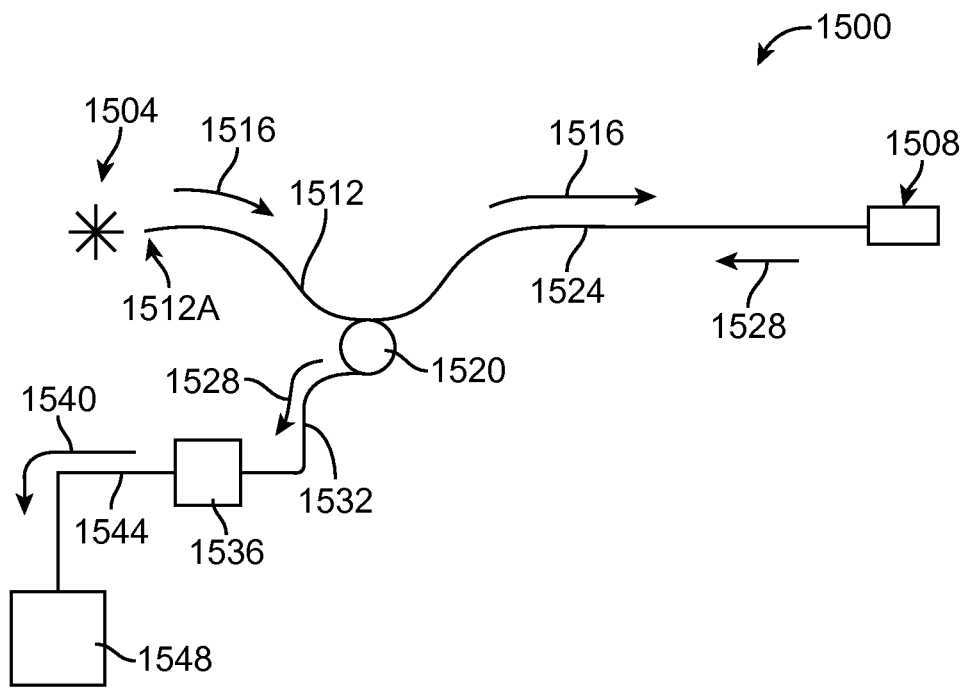
FIG. 15 is a schematic diagram of an LSI-jacket-based sensor system that includes a spectrally broad band light source for providing measurement light.

FIG. 15 shows an LSI-jacket-based sensor and measuring system 1500 made in accordance with aspects of the present invention. System 1500 includes a light source 1504 and an LSI-jacket-based sensor 1508, which may be, for example, any one of the sensors described above in connection with FIGS. 4A, 4B, and 8-14, among others. In this embodiment, light source 1504 is a spectrally broadband light source with low coherence and minimal polarization preference and is optically coupled to an end 1512A of an optical fiber 1512 to provide a light beam 1516 to a beam director 1520 that, among other things, directs light beam 1516 to sensor 1508, here via an optical fiber 1524. Light director 1520 may be, for example, a fiber circulator or beamsplitter. A portion of light beam 1516 is reflected within sensor 1508 back into optical fiber 1524 as a signal-carrying light beam 1528, which optical fiber 1524 conducts back to light director 1520. Light director 1520 then redirects light beam 1528 to an optical fiber 1532, which guides it to an optical spectrometer 1536 that is used to measure the amplitude and wavelength content of signal-carrying light beam 1528. An output 1540 of optical spectrometer 1536 is then directed via a transmission link 1544, which may be a wireless link, an electrical cable, or optical cable, to an output processor 1548. As those skilled in the art will readily appreciate, output processor 1548 may be any suitable processor, such as a general purpose computer, application-specific integrated circuit, system-on-chip, etc., that is capable, for example, via suitable programming and/or hardware, of converting output 1540 into a form suitable for an end user.

Figure 16:
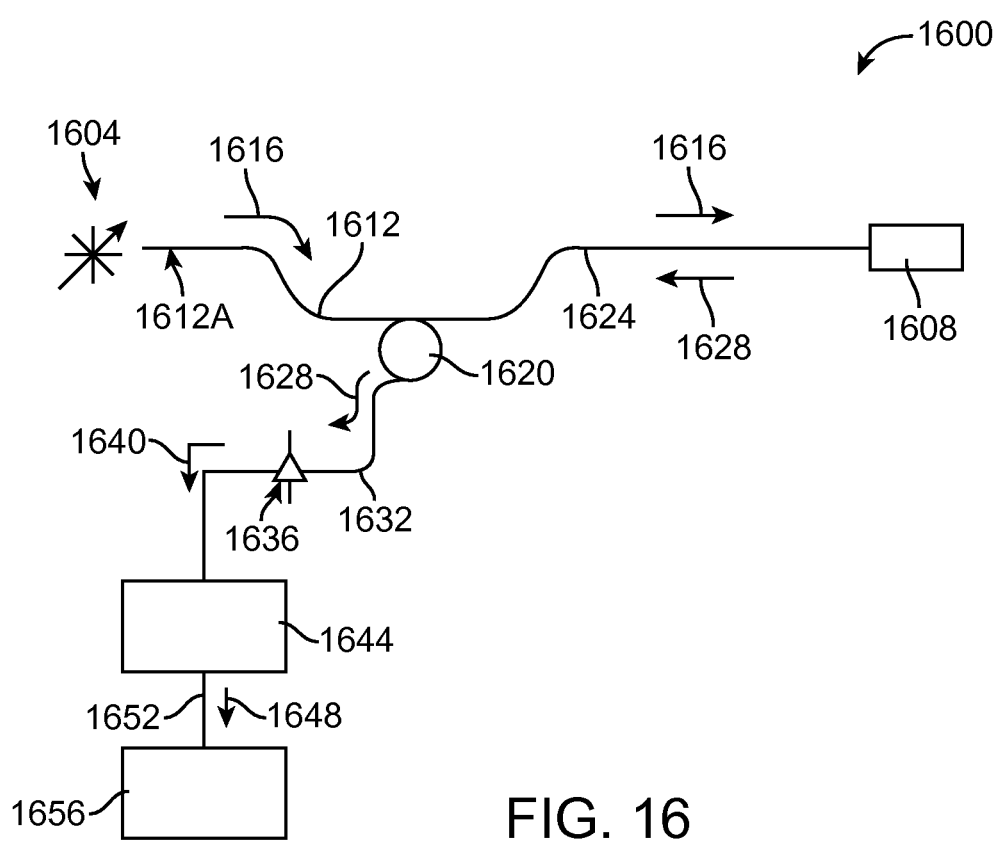
FIG. 16 is a schematic diagram of an LSI-jacket-based sensor system that includes a tunable narrow band light source for providing measurement light.

FIG. 16 shows another LSI-jacket-based sensor and system 1600 made in accordance with aspects of the present invention. System 1600 includes a light source 1604 and an LSI-jacket-based sensor 1608, which may be, for example, any one of the sensors described above in connection with FIGS. 4A, 4B, and 8-14, among others. In distinction to system 1500 of FIG. 15, in the embodiment of FIG. 16 light source 1604 is a tunable light source that may have a narrow spectral output and is optically coupled to an end 1612A of an optical fiber 1612 to provide a light beam 1616 to a beam director 1620 that, among other things, directs light beam 1616 to sensor 1608, here via an optical fiber 1624. Light director 1620 may be, for example, a fiber circulator or beamsplitter. A portion of light beam 1616 is reflected within sensor 1608 back into optical fiber 1624 as a signal-carrying light beam 1628, which optical fiber 1624 conducts back to light director 1620. Light director 1620 then redirects light beam 1628 to an optical fiber 1632, which guides it to an optical detector 1636, such as a photodiode. An output 1640 of optical detector 1636 is then directed to an output processor 1644 that is used to measure the amplitude and wavelength content of light beam 1628 and output information 1648 regarding this content. Output information 1648 may then be directed via a transmission link 1652, which may be a wireless link, an electrical cable, or optical cable, to end-user processor 1656. As those skilled in the art will readily appreciate, end-user processor 1656 may be any suitable processor, such as a general purpose computer, application-specific integrated circuit, system-on-chip, etc., that is capable, for example, via suitable programming and/or hardware, of converting output information 1648 into a form suitable for an end user.

Depending on the exact design of the mechanical structure of a temperature-compensated LSI-jacket-based transverse-load fiber grating sensor, the type of LSI material used, and the design of the optical fiber, the coefficients associated with converting the locations of the dual spectral peaks to strain and temperature may vary. However, once these coefficients are determined, the overall costs associated with the sensor may be quite low. This is due to the ability to write suitable fiber gratings on a draw tower with appropriate coatings in a low cost, mass producible mode with high precision and repeatability. The fiber gratings can then be placed in the load structure, which may be made using precision, but low-cost, manufacturing techniques associated with V-groove structures for the telecommunication industry. The steps of preparing and bonding the final fixture in place are similar to those associated with low-cost telecommunication fiber connector assemblies.

As noted above, LSI-jacket-based sensors and sensor systems made in accordance with the present invention, such as the sensors of FIGS. 4A, 4B, and 8-14 and the sensor systems of FIGS. 15 and 16, may be used in a variety of applications. One exemplary application in which an LSI-jacket-based transverse-force/temperature/moisture sensor, such as sensor 1400 of FIG. 14, may be particularly useful is in electrical transformers, especially power and distribution transformers, for measuring clamping forces in transformer winding cores and moisture in the dielectric materials of the winding cores. For example, as those skilled in the art will recognize, clamping force is established in a power transformer winding assembly during the manufacturing process. A vertical winding stack of a power transformer is made up of copper conductor that can be wrapped in several layers of (low dielectric) paper and separated (disk to disk) by high density cellulose insulation spacers. Depending on the low-voltage, rated-voltage, and high-voltage winding, the ratio of insulation material to copper may vary between 30% to 70%, and the task during manufacture is to reach the minimum dryness (in an oven) and clamp the assembly by shimming each individual winding stack to accomplish the correct clamping pressure.

The insulation material is elastic and when clamped under pressure it will retain the preset clamping force in a static situation. However, in a dynamic situation, such as short-term cyclical loading of the transformer on a power-distribution grid, or with daily/seasonal changes in ambient operating temperature, the clamping force will increase or decrease due to thermal expansion difference between paper and copper. Also, in a short-term loading situation, the moisture is driven in and out of the winding insulation stack, i.e., moisture in the cellulose results in expansion and thickness shrinkage of the radial spacers, resulting in higher or lower dynamic force. In the long term, the total moisture content in the transformer will increase, tending to help the clamping force remain at the factory preset. However, due to thickness shrinkage with age and the effect of periodic short-circuit forces, the preset clamping force tends to reduce.

With a temperature-compensation of a transverse-force sensor, the real change both in the factory static situation and the dynamic situation under load can be measured. However, given the additional ability to measure moisture content directly in the windings provides the ability to benchmark the actual clamping force during manufacture and at initial dryout prior to energizing the transformer on site and when endeavoring to re-clamp the transformer windings as a part of refurbishing should it be required on site. Consequently, an optical-fiber-based sensor system that includes a transverse-force/temperature/moisture sensor, such as an LSI-jacket-based sensor of the present invention, that is immune to electrical and magnetic interferences is particularly suited for use in an electrical transformer wherein such interferences can be present.

Figure 17:
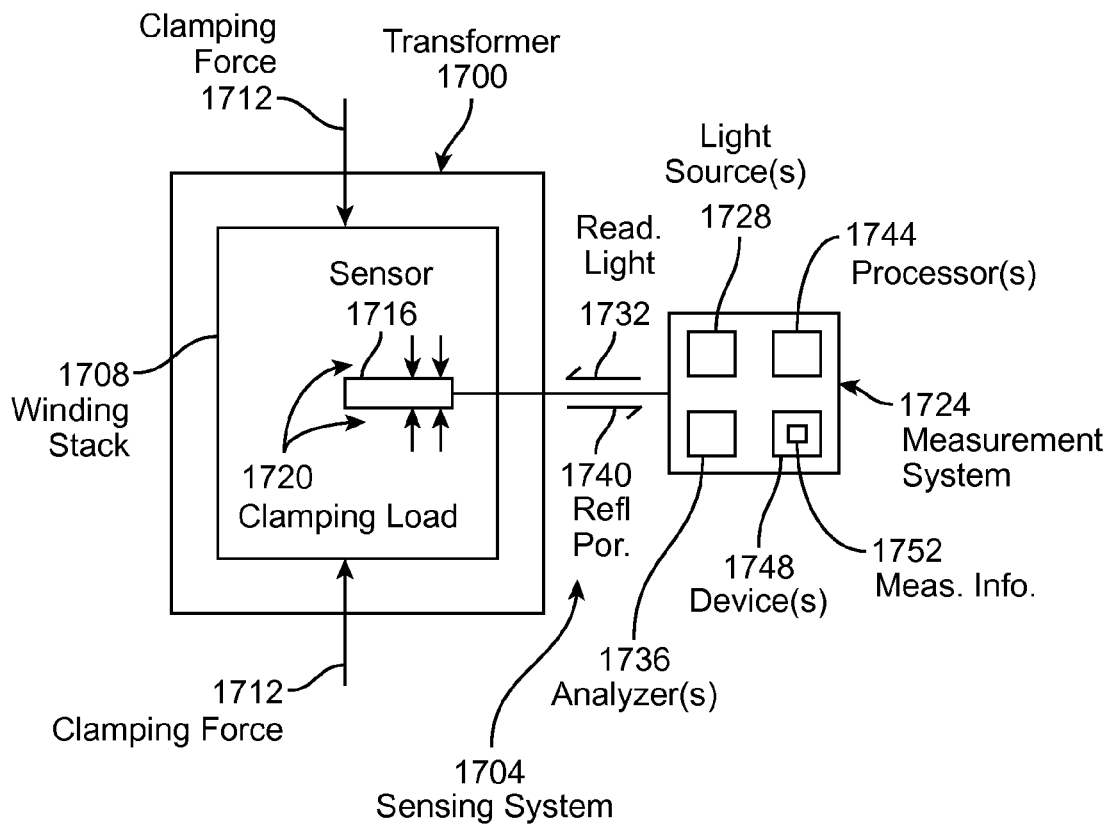
FIG. 17 is a simplified cross-sectional/schematic view of an electrical transformer that includes an LSI-jacket-based transverse-load/temperature/moisture sensor system.

In this connection, FIG. 17 illustrates an exemplary electrical transformer 1700 that incorporates an LSI-jacketed-based transverse-force/temperature/moisture sensing system 1704. Transformer 1700 may be any suitable transformer, such as a power or distribution transformer, that includes at least one winding stack 1708 that is subjected to a clamping force 1712 and comprises one or more dielectric materials, such as cellulose and transformer oil. Sensing system 1704 includes a transverse-force/temperature/moisture sensor 1716 engaged with winding stack 1708 in a manner that allows for measurement of a clamping load 1720 on the sensor as a transverse load that the sensor is designed and configured to measure. Sensor 1716 is also engaged with winding stack 1708 in a manner that allows the moisture-sensing features of the sensor to measure the content of moisture in the dielectric materials in and/or submerging the winding stack. In one example, transverse-force/temperature/moisture sensor 1716 may be the same as or similar to transverse-force/temperature/moisture sensor 1400 of FIG. 14. In this example, sensing system 1704 also includes a measurement system 1724 that includes one or more suitable light sources 1728 for providing reading light 1732 to the various fiber gratings (not shown) present in sensor 1716, one or more optical analyzers 1736 for analyzing the portion 1740 of the reading light reflected by the fiber gratings, and one or more processors 1744 and/or other devices 1748 (e.g., wired port(s), wireless transmitters, electronic display(s), etc. and any combination thereof), for, respectively, determining and outputting measurement information 1752 concerning transverse loading, temperature, and moisture content of winding stack 1708. It is noted that the temperature information may be temperature compensated measurements of transverse loading and/or moisture content or temperature measurements, or both. A detailed example of a transformer that includes a clamping-force sensor is presented in U.S. Pat. No. 8,522,626, titled "CLAMPING FORCE SENSOR ASSEMBLY FOR MONITORING TRANSFORMER DEGRADATION" and issued on Sep. 3, 2013, to Woodcock, which is incorporated herein by reference for all of its disclosure of using a clamping-force sensor in transformers. Of course, the sensor and sensor system disclosed therein would be replaced with an LSI-jacket-based sensor and sensor system made in accordance with the present disclosure.

Figure 18:
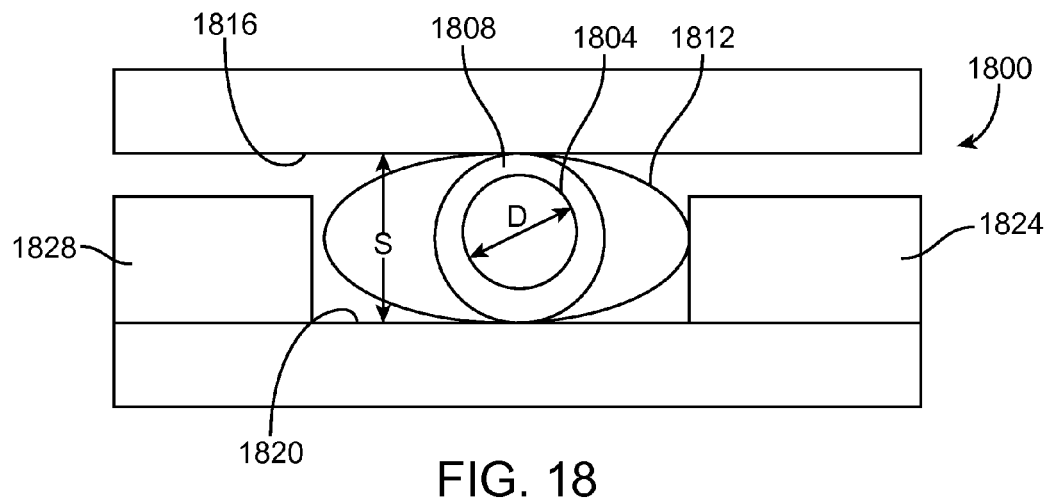
FIG. 18 is a transverse cross-sectional view of an alternative LSI-jacket-based transverse-load sensor made in accordance with the present invention.

FIG. 18 illustrates another transverse-load fiber-grating sensor 1800 made in accordance with the present invention. Referring now to FIG. 18, sensor 1800 comprises an optical fiber 1804 that contains a fiber grating (not shown) and an LSI coating 1808 that may be, for example, an ORMOCER® material. It is noted that while not shown in FIG. 18, the fiber grating may be like other fiber gratings shown and described herein, such as grating 404C of FIG. 4B. Sensor 1800 also includes a deformable strain relief tube 1812 placed around optical fiber 1804 and jacket 1808. Tube 1812, along with the inserted portion of optical fiber 1804 and jacket 1808, is placed between two surfaces 1816 and 1820 that are subject to a transverse load (not shown, but in the manner of other transverse loads shown and described herein, such as transverse loads 440 and 1324 of FIGS. 4A and 13, respectively). Surfaces 1816 and 1820 may directly engage tube 1812, thereby deforming jacket 1808 so that it moves longitudinally along the longitudinal axis of optical fiber 1804. A set of spacers 1824 and 1828 may be used to limit the spacing between surfaces 1816 and 1820. The resulting spacing, S, may, for example, be chosen to be equal to the diameter, D, of optical fiber 1804. For an electrical transformer application, such as described above relative to FIG. 17, surfaces 1816 and 1820 may be the surfaces of electrical insulation material that forms part of the transformer at issue.

Figure 19:
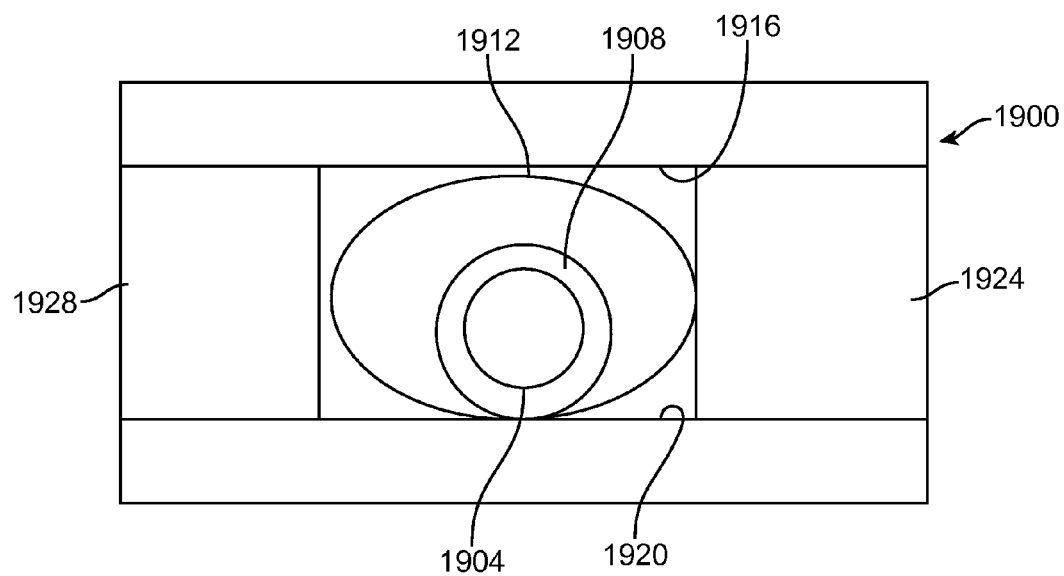
FIG. 19 is a transverse cross-sectional view of a fiber-grating-based temperature sensor made in accordance with the present invention.

FIG. 19 shows a fiber-grating sensor 1900 that is similar to transverse-load fiber-grating sensor 1800 shown in FIG. 18, but is designed and configured to support a fiber grating (not shown) intended to measure temperature. Temperature sensor 1900 of FIG. 19 comprises an optical fiber 1904, an LSI coating 1908, which may be an ORMOCER® material, and a strain relief tube 1912 provided to protect the optical fiber. A pair of upper and lower surfaces 1916 and 1920, respectively, are separated by a set of spacers 1924 and 1928 so that coating 1908 is not engaged by the surfaces when the sensor is subjected to a transverse load. In this manner, the fiber grating located between spacers 1924 and 1928 is affected by temperature but isolated from transverse-load-induced strain. For an electrical transformer application, such as illustrated in FIG. 17, tube 1912 may be perforated, slit, or otherwise configured to allow for the free flow of transformer dielectric oil in the region of the fiber grating that is enhanced by the open structure of temperature sensor 1900. In a transformer application, surfaces 1916 and 1920 may be the surfaces of electrical insulation material that forms part of the transformer at issue.

Figure 20:
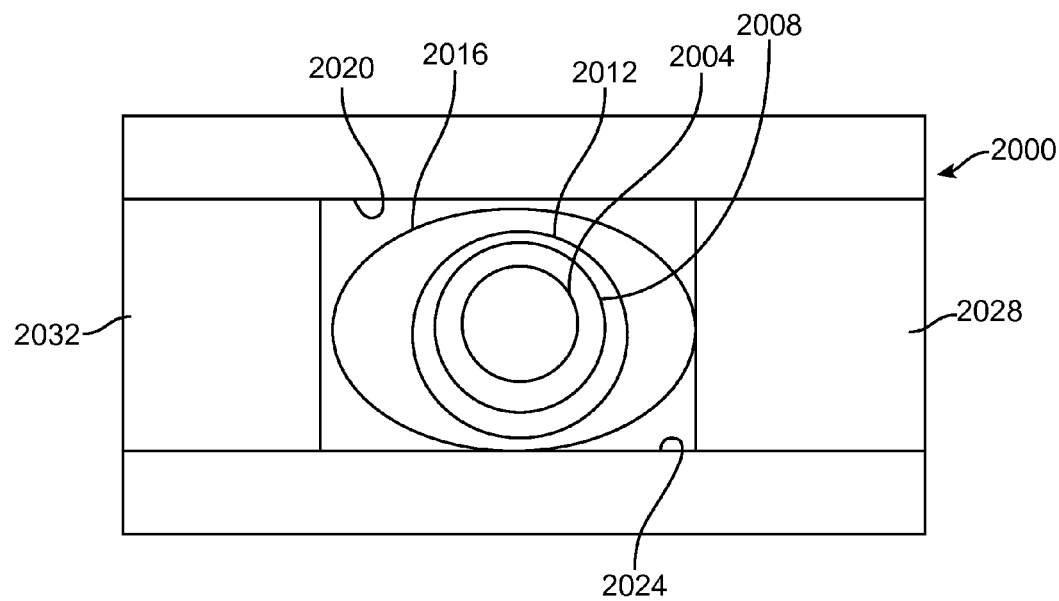
FIG. 20 is a transverse cross-sectional view of an alternative LSI-jacket-based moisture/chemical sensor made in accordance with the present invention.

FIG. 20 shows a fiber-grating sensor 2000 that is similar to temperature fiber-grating sensor 1900 shown in FIG. 19, but is designed and configured to support the measurement of water or chemical content. Sensor 2000 of FIG. 20 includes an optical fiber 2004 that may have one or more coatings. A first coating 2008 may be an ORMOCER® or a similar material that is relatively unresponsive to changes in water and chemical content, or it may be an LSI jacket of material that does respond to water or chemical content, such as a polyimide coating for water. If first coating 2008 is not responsive to water or chemical content, a second coating 2012 that is an LSI jacketing material responsive to water or chemical content changes may be provided over the first coating. In the case of a moisture sensor, LSI coating 2012 may be a polyimide. A strain-relief tube 2016 may be placed around optical fiber 2004 to provide protection. A pair of surfaces 2020 and 2024 are separated by a set of spacers 2028 and 2032 so that the optical fiber 2004 is isolated from any transverse load applied to sensor 2000. For an application of sensor 2000 to an electrical transformer, strain relief tube 2016 may be perforated, slit, or otherwise configured to allow the free flow of transformer dielectric oil and contaminants such as water and undesired chemicals to flow around and into contact with coating 2012 when a dual coating is used or with coating 2008 when a single coating is used so that the corresponding coating can respond to water- or chemical-content changes. In a transformer application, surfaces 2020 and 2024 may be the surfaces of electrical insulation material that forms part of the transformer at issue.

Figure 21:
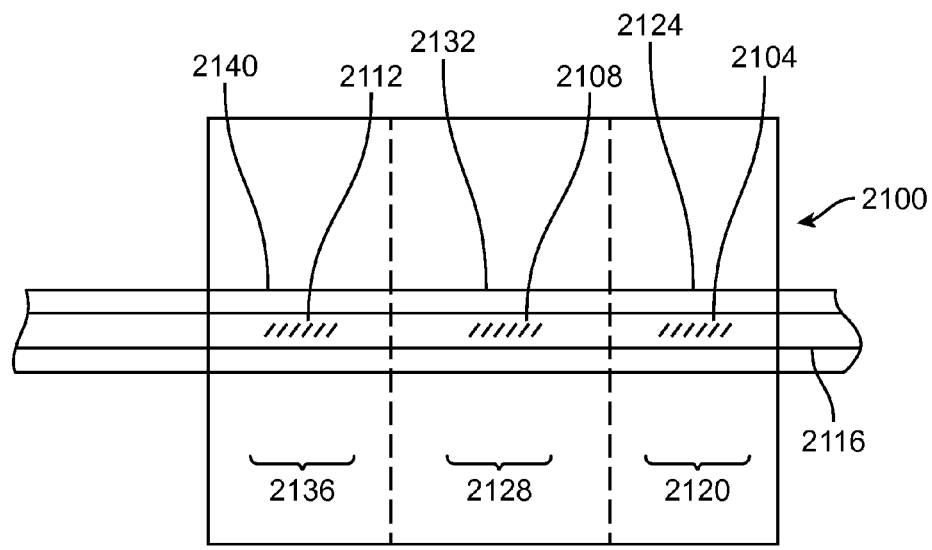
FIG. 21 is a plan view of an alternative LSI-jacket-based transverse-load sensor designed with temperature compensation and the ability to measure water or chemical content.

FIG. 21 shows a sensor 2100 that is used to measure transverse load, temperature, and water/chemical content. In the embodiment shown in FIG. 21, three in line fiber gratings 2104, 2108, and 2112 are located in an optical fiber 2116 and have sufficient differences in wavelength so that their signals do not overlap. A first region 2120 contains a water/chemical content sensor similar to water/chemical content sensor 2000 shown in FIG. 20. An LSI coating 2124 in region 2120 is designed/selected to respond to changes in water/chemical content. In one example, LSI coating 2124 may be a polyimide for water content measurements. The spacing (not seen in the view of FIG. 21) between upper and lower surfaces (not shown, but similar to surfaces 2020 and 2024 of FIG. 20) is sufficient to isolate optical fiber 2116 from transverse-load-induced strain in region 2120. In this embodiment, a second region 2128 contains a transverse-load sensor similar to transverse-load sensor 1800 of FIG. 18. The spacing (not seen in the view of FIG. 21) between the upper and lower surfaces (not shown, but similar to surfaces 1816 and 1820 of FIG. 18) is arranged so that the transverse load (not shown) is engaged and an LSI coating 2132 in region 2128 elongates with changing transverse load. Coating 2132 may be an ORMOCER® or a similar material. A third region 2136 contains a temperature sensor configured similar to temperature sensor 1900 of FIG. 19. The upper and lower surfaces, not shown, but similar to surfaces 1916 and 1920 of FIG. 19) are separated sufficiently so that an LSI coating 2140 in region 2136 is not engaged by any transverse load applied to sensor 2100. It is noted that the spatial order of transverse-load-sensing region 2128, temperature-sensing region 2136, and moisture-sensing region 2120 of sensor 2100 shown is merely exemplary and can be changed. In addition, a single strain-relief tube could be used to support all three sensors with slits, perforations, or other means to support transformer dielectric oil flow for electrical transformer applications. The LSI coating used to support transverse-load and temperature measurements could be an ORMOCER® or a similar material and a coating of polyimide over an ORMOCER® or a similar jacket may be used to support water-content measurement. Alternatively the ORMOCER® jacket in first region 2120 could be stripped off and a polyimide used for recoating. The upper and lower surfaces of the assembly could be formed directly into electrically insulating material out of a single piece, for example, using numerical machining methods. These procedures would lower cost and simplify assembly and insertion into an electrical transformer.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A sensor assembly for measuring a compressive load applied externally to the sensor assembly, the sensor assembly comprising:
   a first coated optical fiber;
   first and second rigid transverse-load-applying structures having corresponding respective first and second confronting faces facing one another and spaced from one another so as to define a gap, said first confronting face having a length and including a first elongate recess extending the entirety of said length, said first elongate recess containing said first coated optical fiber along the entirety of said length and configured so that said first coated optical fiber has at least one discrete line of contact with said first elongate recess along the entirety of said length; and
   a bonding material securing said first and second rigid transverse-load-applying structures to one another with said first coated optical fiber in contact with each of said first and second rigid transverse-load-applying structures;

wherein said first coated optical fiber comprises:
a first optical fiber having a first Bragg grating applied thereto and located between said first and second rigid transverse-load-applying structures; and
a first longitudinal-strain-inducing jacket coating coupled to said first optical fiber and extending along the entirety of said length, said first longitudinal-strain-inducing jacket coating having a uniform thickness along the entirety of said length and selected and configured to induce increasing uniform axial tensile strain in said first optical fiber at said first Bragg grating as a function of increasing magnitude of the compressive load when the compressive load is applied across the sensor assembly in a direction perpendicular to each of said first and second confronting faces of said first and second rigid transverse-load-applying structures.

2. A sensor assembly according to claim 1, further comprising a second Bragg grating applied to said first optical fiber, said second Bragg grating spaced from said first Bragg grating and provided for temperature compensation of measurements utilizing said first Bragg grating.

3. A sensor assembly according to claim 1, wherein said second confronting face of said second rigid transverse-load-applying structure has a second elongate recess located opposite said first elongate recess, said second elongate recess receiving said first coated optical fiber and designed and configured to optimize elongation of said first longitudinal-strain-inducing jacket coating in response to application of the compressive load.

4. A sensor assembly according to claim 1, further comprising at least one load-balancing spacer located in said gap in spaced relation to said first coated optical fiber, wherein said at least one load-balancing spacer is dimensioned as a function of said first coating optical fiber.

5. A sensor assembly according to claim 4, wherein said at least one load-balancing spacer comprises a second optical fiber coated with a jacket to substantially match said first longitudinal-strain-inducing jacket coating of said first coated optical fiber.

6. A sensor assembly according to claim 1, further comprising a second Bragg grating applied to said first optical fiber in spaced relation to said first Bragg grating, wherein said second Bragg grating is located out from in between said first and second rigid transverse-load-applying structures.

7. A sensor assembly according to claim 6, wherein said second Bragg grating is provided as a temperature-sensing grating.

8. A sensor assembly according to claim 7, further comprising:
a third Bragg grating applied to said first optical fiber in spaced relation to each of said first Bragg grating and said second Bragg grating, wherein said third Bragg grating is located out from in between said first and second rigid transverse-load-applying structures; and
a second longitudinal-strain-inducing jacket coating coupled to said first optical fiber and extending along a longitudinal axis, said second longitudinal-strain-inducing jacket coating selected and configured to induce axial strain in said first optical fiber at said third Bragg grating as a function of change in an amount of a substance present around the sensor assembly.

9. A sensor assembly according to claim 6, wherein said second Bragg grating is provided as a substance-sensing grating and the sensor assembly further comprises a second longitudinal-strain-inducing jacket coating coupled to said first optical fiber and extending along a longitudinal axis, said second longitudinal-strain-inducing jacket coating selected and configured to induce axial strain in said first optical fiber at said second Bragg grating as a function of presence of a substance.

10. A sensor assembly according to claim 9, wherein said second Bragg grating is provided as a moisture-sensing grating and said second longitudinal-strain-inducing jacket coating is selected and configured to induce axial strain in said first optical fiber at said second Bragg grating as a function of presence of moisture.

11. A sensor assembly according to claim 1, wherein said first elongate recess has an arcuate transverse cross-sectional shape uniform along the entirety of said length so as to provide a single discrete line of contact between said first coated optical fiber and said first elongate recess along the entirety of said length.

12. A sensor assembly according to claim 1, wherein said first elongate recess has a V-shape transverse cross-sectional shape uniform along the entirety of said length so as to provide two discrete lines of contact between said first coated optical fiber and said first elongate recess along the entirety of said length.

13. A sensor assembly according to claim 1, wherein said first elongate recess has a depth such that when said first optical fiber, without said first longitudinal-strain-inducing jacket coating present, is fully engaged with said first elongate recess, an uppermost portion of said first optical fiber is substantially flush with said first conforming face of said first rigid transverse-load-applying structure.

14. A sensor assembly according to claim 1, wherein said bonding material fills said gap between said first and second rigid transverse-load-applying structures.

15. A sensor assembly according to claim 1, wherein said first coated optical fiber is in contact with both of said first and second rigid transverse-load-applying structures along a contact zone having first and second ends spaced from one another along said length, wherein said first Bragg grating is distal from each of said first and second ends.

16. An electrical transformer, comprising:
an electrical winding subject to a clamping load; and
a transverse-pressure sensor engaged with said electrical winding so as to measure the clamping load, said transverse-pressure sensor comprising:
a first coated optical fiber;
first and second rigid transverse-load-applying structures having corresponding respective first and second confronting faces oriented perpendicular to the clamping force and facing one another and spaced from one another so as to define a gap, said first confronting face having a length and including a first elongate recess extending the entirety of said length, said first elongate recess containing said first coated optical fiber along the entirety of said length and configured so that said first coated optical fiber has at least one discrete line of contact with said first elongate recess along the entirety of said length; and
a bonding material securing said first and second rigid transverse-load-applying structures to one another with said first coated optical fiber in contact with each of said first and second rigid transverse-load-applying structures;
wherein said first coated optical fiber comprises:
a first optical fiber having a first Bragg grating applied thereto and located between said first and second rigid transverse-load-applying structures; and a first longitudinal-strain-inducing jacket coating coupled to said first optical fiber and extending along the entirety of said length, said first longitudinal-strain-inducing jacket coating having a uniform thickness along the entirety of said length and selected and configured to induce increasing uniform axial tensile strain in said first optical fiber at said first Bragg grating as a function of increasing magnitude of the clamping force.

17. An electrical transformer according to claim 16, wherein said second confronting face of said second rigid transverse-load-applying structure has a second elongate recess located opposite said first elongate recess, said second elongate recess receiving said coating optical fiber and designed and configured to optimize elongation of said first longitudinal-strain-inducing jacket coating in response to application of the clamping load.

18. An electrical transformer according to claim 16, further comprising at least one load-balancing spacer located in said gap in spaced relation to said first coating optical fiber, wherein said at least one load-balancing spacer is dimensioned as a function of said first coated optical fiber.

19. An electrical transformer according to claim 18, wherein said at least one load-balancing spacer comprises a second optical fiber coated with a jacket to substantially match said first longitudinal-strain-inducing jacket coating of said first coated optical fiber.

20. An electrical transformer according to claim 16, further comprising a second Bragg grating applied to said first optical fiber in spaced relation to said first Bragg grating, wherein said second Bragg grating is located out from in between said first and second rigid transverse-load-applying structures.

21. An electrical transformer according to claim 20, wherein said second Bragg grating is provided as a temperature-sensing grating.

22. An electrical transformer according to claim 21, further comprising:
a third Bragg grating applied to said first optical fiber in spaced relation to each of said first Bragg grating and said second Bragg grating, wherein said third Bragg grating is located out from in between said pair of transverse-load-applying structures; and
a second longitudinal-strain-inducing jacket coating coupled to said first optical fiber and extending along a longitudinal axis, said second longitudinal-strain-inducing jacket coating selected and configured to induce axial strain in said first optical fiber at said third Bragg grating as a function of change in moisture present in said electrical winding.

23. An electrical transformer according to claim 20, wherein said second Bragg grating is provided as a moisture-sensing grating and said transverse-pressure sensor further comprises a second longitudinal-strain-inducing jacket selected and configured to induce axial strain in said first optical fiber at said second Bragg grating as a function of presence of moisture.

24. An electrical transformer according to claim 16, wherein said first elongate recess has an arcuate transverse cross-sectional shape uniform along the entirety of said length so as to provide a single discrete line of contact between said first coated optical fiber and said first elongate recess along the entirety of said length.

25. An electrical transformer according to claim 16, wherein said first elongate recess has a V-shape transverse cross-sectional shape uniform along the entirety of said length so as to provide two discrete lines of contact between said first coated optical fiber and said first elongate recess along the entirety of said length.

26. An electrical transformer according to claim 16, wherein said first elongate recess has a depth such that when said first optical fiber, without said first longitudinal-strain-inducing jacket coating present, is fully engaged with said first elongate recess, an uppermost portion of said first optical fiber is substantially flush with said first confronting face of said first rigid transverse-load-applying structure.

27. An electrical transformer according to claim 16, wherein said bonding material fills said gap between said first and second rigid transverse-load-applying structures.

28. An electrical transformer according to claim 16, wherein said first coated optical fiber is in contact with both of said first and second rigid transverse-load-applying structures along a contact zone having first and second ends spaced from one another along said length, wherein said first Bragg grating is distal from each of said first and second ends.

* * * * *